US010743541B2

(12) United States Patent
Zumsteg et al.

(10) Patent No.: US 10,743,541 B2
(45) Date of Patent: Aug. 18, 2020

(54) MIC REDUCTION WITH LITHIUM IONS

(71) Applicant: Omya International AG, Oftringen (CH)

(72) Inventors: Anita Zumsteg, Meilen (CH); Joachim Glaubitz, Sins (CH); Simon Urwyler, Bern (CH); Matthias Buri, Rothrist (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/125,706

(22) PCT Filed: Apr. 8, 2015

(86) PCT No.: PCT/EP2015/057637
§ 371 (c)(1),
(2) Date: Sep. 13, 2016

(87) PCT Pub. No.: WO2015/155252
PCT Pub. Date: Oct. 15, 2015

(65) Prior Publication Data
US 2017/0020134 A1    Jan. 26, 2017

(30) Foreign Application Priority Data

Apr. 10, 2014  (EP) ..................... 14164224

(51) Int. Cl.
*A01N 59/00* (2006.01)
*A01N 47/44* (2006.01)
*A01N 47/40* (2006.01)
*A01N 43/88* (2006.01)
*A01N 43/80* (2006.01)
*A01N 43/78* (2006.01)
*A01N 43/40* (2006.01)
*A01N 43/32* (2006.01)
*A01N 41/10* (2006.01)
*A01N 35/02* (2006.01)
*A01N 33/20* (2006.01)
*A01N 31/08* (2006.01)
*A01N 59/06* (2006.01)
*A01N 47/02* (2006.01)
*A01N 43/90* (2006.01)
*A01N 35/08* (2006.01)
*A01N 27/00* (2006.01)

(52) U.S. Cl.
CPC ............ *A01N 59/00* (2013.01); *A01N 31/08* (2013.01); *A01N 33/20* (2013.01); *A01N 35/02* (2013.01); *A01N 41/10* (2013.01); *A01N 43/32* (2013.01); *A01N 43/40* (2013.01); *A01N 43/78* (2013.01); *A01N 43/80* (2013.01); *A01N 43/88* (2013.01); *A01N 47/40* (2013.01); *A01N 47/44* (2013.01); *Y02A 50/359* (2018.01)

(58) Field of Classification Search
None
See application file for complete search history.

(56) References Cited

U.S. PATENT DOCUMENTS

| 4,871,754 | A   | 10/1989 | Bauer et al. |
| 5,278,248 | A   | 1/1994  | Egraz et al. |
| 5,496,398 | A   | 3/1996  | Drew et al. |
| 6,569,229 | B1  | 5/2003  | Buri et al. |
| 2001/0009682 | A1 | 7/2001 | Whiteley |
| 2003/0018121 | A1* | 1/2003 | Weitzel ............... C09D 133/06 524/556 |
| 2006/0111410 | A1 | 5/2006 | Wachtler et al. |
| 2009/0120327 | A1 | 5/2009 | Buri |
| 2010/0330142 | A1* | 12/2010 | Falk .................. A01N 43/80 424/421 |
| 2011/0097311 | A1* | 4/2011 | Di Maiuta ............ A01N 35/02 424/93.47 |
| 2013/0090361 | A1 | 4/2013 | Uhr |
| 2014/0000486 | A1 | 1/2014 | Buri et al. |

FOREIGN PATENT DOCUMENTS

| EP | 1661587 A1 | 5/2006 |
| EP | 2108260 A2 | 10/2009 |
| EP | 2199348 A1 | 6/2010 |
| EP | 2272348 A1 | 1/2011 |
| EP | 2374353 A1 | 10/2011 |
| EP | 2596702 A1 | 5/2013 |

(Continued)

OTHER PUBLICATIONS

Maiuta et al. "Enhancement of the antimicrobial performance of biocidal formulations used for the preservation of white mineral dispersions." App. Microbiol. Biotechnol. (2011) 89:429-439.

(Continued)

*Primary Examiner* — Jeffrey T. Palenik
(74) *Attorney, Agent, or Firm* — Heslin Rothenberg Farley & Mesiti P.C.

(57) ABSTRACT

The invention relates to a process for reducing the minimum inhibitory concentration (MIC) of a biocide against at least one strain of bacteria and/or at least one strain of yeast and/or at least one strain of mould in an aqueous preparation. The invention further relates to the use of a water soluble source of lithium ions for reducing the minimum inhibitory concentration (MIC) of a biocide against at least one strain of bacteria and/or at least one strain of yeast and/or at least one strain of mould in an aqueous preparation.

21 Claims, No Drawings

(56) References Cited

FOREIGN PATENT DOCUMENTS

| WO | 0036913 A2 | 6/2000 |
| WO | 02052941 A1 | 7/2002 |
| WO | 2004040979 A1 | 5/2004 |
| WO | 2006079911 A1 | 8/2006 |

OTHER PUBLICATIONS

The International Search Report dated May 11, 2015 for PCT Application No. PCT/EP2015/057637.
The Written Opinion of International Searching Authority dated May 11, 2015 for PCT Application No. PCT/EP2015/057637.

\* cited by examiner

MIC REDUCTION WITH LITHIUM IONS

CROSS-REFERENCE TO RELATED APPLICATIONS

This is a U.S. national phase of PCT Application No. PCT/EP2015/057637, filed Apr. 8, 2015, which claims priority to European Application No. 14164224.9, filed Apr. 10, 2014.

The invention relates to a process for reducing the minimum inhibitory concentration (MIC) of a biocide against at least one strain of bacteria and/or at least one strain of yeast and/or at least one strain of mould in an aqueous preparation. The invention further relates to the use of a water soluble source of lithium ions for reducing the minimum inhibitory concentration (MIC) of a biocide against at least one strain of bacteria and/or at least one strain of yeast and/or at least one strain of mould in an aqueous preparation.

In practice, aqueous preparations and especially suspensions, dispersions or slurries of water-insoluble solids such as minerals, fillers or pigments are used extensively in the paper, paint, rubber and plastics industries as coatings, fillers, extenders and pigments for papermaking as well as aqueous lacquers and paints. For example, suspensions or slurries of calcium carbonate, talc or kaolin are used in the paper industry in large amounts as filler and/or as a component in the preparation of coated paper. Typical aqueous preparations of water-insoluble solids are characterized in that they comprise water, a water-insoluble solid compound and optionally further additives, such as dispersing agents, in the form of a suspension, a slurry or dispersion with a water-insoluble solid content of 0.1 to 99.0 wt.-% based on the total weight of the preparation. A typical aqueous preparation is a White Mineral Dispersion (WMD) having a solids content of 45.0 to 78.0 wt.-%. Water-soluble polymers and copolymers which may be used as e.g. dispersant and/or grinding aid in such preparation are, for example, described in U.S. Pat. No. 5,278,248.

The aforementioned aqueous preparations are often subject to contamination by microorganisms such as fungi, yeasts, protozoa and/or aerobic and anaerobic bacteria resulting in changes in the preparation properties such as changes in viscosity and/or pH, discolorations or reductions in other quality parameters, which negatively affect their commercial value. Therefore, the manufacturers of such aqueous preparations usually take measures for stabilizing the suspensions, dispersions or slurries. For example, it is known that numerous biocides may reduce the growth and accumulation of such microorganisms in aqueous preparations and, thus, reduce the tendency of undesired alterations of these preparations, like viscosity changes or unpleasant odours.

For ensuring an acceptable microbiological quality of aqueous preparations, preservatives or biocides are used over the entire life cycle of the preparation (production, storage, transport, use). In the art, several approaches for improving the microbiological quality of aqueous preparations have been proposed. For example, EP 1 139 741 describes aqueous suspensions or dispersions of minerals, fillers and/or pigments, containing a microbiocidal agent in the form of a solution and derivatives of phenol in partially neutralized form. U.S. Pat. No. 5,496,398 relates to a process for the reduction of microorganisms in kaolin clay slurries by a combination of low temperature heat and reduced levels of a microbiocidal agent. WO 02/052941 describes biocide compositions for incorporation into paints, coating, plasters and plastics comprising at least one metal oxide and at least one metal salt. US 2006/0111410 mentions a mixture comprising 1,2-benzisothiazolinone (BIT) and tetramethylolacetylenediurea (TMAD) for protecting industrial materials and products against attack and destruction by microorganisms. Furthermore, it is suggested in the art to add formaldehyde-releasing substances to such aqueous preparations for improving the microbiological quality. For example, U.S. Pat. No. 4,655,815 mentions a antimicrobial composition comprising a formaldehyde donor. Furthermore, WO 2006/079911 describes a method of protection against microorganisms by increasing the $OH^-$ ion concentration of the suspension.

WO 2004/040979 A1 relates to synergic antimicrobial mixtures containing 1,2-benzisothiazolinon (BIT) and benzylhemiformal (BHF). The corresponding mixtures are used, for example, for slurries of pigments. EP 1 661 587 A1 relates to germicidal compositions including phthalaldehyde as an active ingredient. It is indicated in EP 1 661 587 A1 that halide ions, carbonate salts and bicarbonate salts may enhance the germicidal efficacy of phthalaldehyde against highly resistant *Bacillus subtilis* spores. US 2001/0009682 A1 relates to disinfectant concentrates having improved biocidal activity which may contain an aldehyde such as glutaraldehyde, a glycol and a lithium based buffer. It is described in US 2001/0009682 A1 that the buffer is required to control the pH of both the concentrate and its dilutions within the desired biocidal effective range. EP 2 199 348 A1 relates to a process for manufacturing aqueous mineral material suspensions or dried mineral materials using at least one lithium ion neutralised water-soluble organic polymer as well as the use of the lithium ion neutralised water-soluble organic polymer in the manufacturing process as a dispersing and/or grinding enhancer. EP 2 374 353 A1 refers to a process for preserving an aqueous preparation of mineral material like e.g. calcium carbonate preparations. EP 2 596 702 A1 refers to a process for stabilising an aqueous mineral preparation comprising a step of adding at least one aldehyde-containing and/or aldehyde-releasing and/or phenolic and/or isothiazoline biocide to said aqueous mineral preparation. U.S. Pat. No. 4,871,754 refers to aqueous solutions which are protected from infestation by micro-organisms by use of a biocide which is an aqueous formulation of the lithium salt of 1,2-benzisothiazolin-3-one. EP 2 272 348 A1 refers to a biocidal agent (I) comprising 98% of one or more halogen-free isothiazolinones, and 1-500 wt.ppm of copper (II)-ions. It is further described that BIT may be provided in the form of its alkali metal salt. However, none of said documents is concerned with a process for reducing the minimum inhibitory concentration (MIC) of a biocide against at least one strain of bacteria and/or at least one strain of yeast and/or at least one strain of mould in an aqueous preparation by the addition of at least one water soluble source of lithium ions.

Furthermore, the applicant is aware of EP 2 108 260 A2 referring to a process for bacterial stabilising aqueous preparations like e.g. calcium carbonate slurries and a composition which can be used for the biocidal treatment of such aqueous preparations. In particular, EP 2 108 260 A2 describes that said preparation comprises at least one mineral and at least one strain of bacteria which is resistant to, tolerant to and/or degrade aldehyde-releasing and/or aldehyde-based biocides. Thus, the biocide alone shows no effect against the bacteria present in the preparation such that an unhindered growth of bacteria is observed. Furthermore, due to the bacteria which are considered as being resistant to, tolerant to and/or degrade the aldehyde-releasing or aldehyde-based biocide present in the preparation, no minimum inhibitory concentration (MIC) of the biocide was determined.

The use of biocides in aqueous preparations is subject to continuously increasing limitations especially regarding the biocide concentrations.

However, at reduced biocide concentration the efficacy of the respective biocide against bacteria, yeasts and/or moulds is usually not satisfactory anymore in comparison to the biocidal efficacy observed at a higher concentration of the same biocide and, thus, the obtained biocidal action at reduced biocide concentration is typically insufficient to avoid microbially induced alteration of aqueous preparations.

Therefore, there is still a need in the art for adequate processes for providing sufficient biocidal activity in aqueous preparations such as solutions, suspensions, dispersions and slurries in order to achieve a longer lasting and sufficient stabilization of the aqueous preparations at reduced biocide concentration. In other words, there is still a need for processes for providing sufficient biocidal activity in aqueous preparations in which the effective biocide concentration is below the minimum inhibitory concentration (MIC) of the respective biocide.

Thus, it is an objective of the present invention to provide a process for providing sufficient biocidal activity in aqueous preparations such as solutions, suspensions, dispersions and slurries at reduced biocide concentration. In particular, it is thus an objective of the present invention to provide a process for reducing the minimum inhibitory concentration (MIC) of a biocide against at least one strain of bacteria and/or at least one strain of yeast and/or at least one strain of mould in the aqueous preparation. A further objective of the present invention is to provide a process for reducing the minimum inhibitory concentration (MIC) of a biocide such that the growth and accumulation of microorganisms in aqueous preparations are reduced or prevented and, thus, significantly reducing the tendency of alterations of these preparations and maintaining their desired chemical and mechanical properties such as viscosity, pH, brilliance and colour and preventing bad odour. Another objective of the present invention is to provide a process for reducing the minimum inhibitory concentration (MIC) of a biocide which is effective against at least one strain of bacteria and/or at least one strain of yeast and/or at least one strain of mould in the aqueous preparation. Another objective is to provide a process for reducing the minimum inhibitory concentration (MIC) of a biocide such that a bacterial stabilisation and/or disinfection and/or preservation and/or control of the microbial contamination of aqueous preparations is given. Even a further objective of the invention is to provide an aqueous composition which provides sufficient biocidal activity in aqueous preparations at reduced biocide concentration, i.e. at a biocide concentration which is below the minimum inhibitory concentration (MIC) of the respective biocide in the absence of a compound reducing the minimum inhibitory concentration (MIC reducing compound).

These and other objectives of the present invention can be solved by a process and an aqueous preparation as described in the present invention and defined in the claims.

According to one aspect of the present application a process for reducing the minimum inhibitory concentration (MIC) of a biocide against at least one strain of bacteria and/or at least one strain of yeast and/or at least one strain of mould in an aqueous preparation is provided. The process comprises the steps of:

a) providing an aqueous preparation,
b) providing at least one biocide,
c) providing at least one water soluble source of lithium ions,
d) contacting the aqueous preparation of step a) with the at least one biocide of step b), wherein the at least one biocide is effective against at least one strain of bacteria and/or at least one strain of yeast and/or at least one strain of mould when present in the aqueous preparation,
e) contacting the aqueous preparation of step a) before and/or during and/or after step d) with the at least one water soluble source of lithium ions of step c) in an amount such that the minimum inhibitory concentration (MIC) of the at least one biocide against the at least one strain of bacteria and/or at least one strain of yeast and/or at least one strain of mould fulfils the equation (I)

$$MIC_{withoutLi}/MIC_{Li} \geq 1.1 \qquad (I)$$

wherein $MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm, calculated relative to the weight of water in the aqueous preparation of step a), $MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm, calculated relative to the weight of water in the aqueous preparation of step a), wherein the at least one water soluble source of lithium ions is present in the water phase of the aqueous preparation such that the total amount of lithium ions is from 15.0 to 800.0 mMol/L, calculated relative to the weight of water in the aqueous preparation, and wherein the at least one biocide is present in the water phase of the aqueous preparation in an amount of from 0.4 to 6 500.0 ppm, calculated relative to the weight of water in the aqueous preparation.

In accordance with the present invention, the lithium ions of the at least one water soluble source of lithium ions may be regarded as a compound reducing the minimum inhibitory concentration (MIC reducing compound) of a biocide. When subsequently reference is made to a MIC reducing compound, the lithium ions of the at least one water soluble source of lithium ions is meant.

The term "minimum inhibitory concentration (MIC)" refers to the lowest concentration of the respective biocide required for preventing or reducing the growth and/or accumulation of the at least one strain of bacteria and/or at least one strain of yeast and/or at least one strain of mould in the aqueous preparation, i.e. when the bacterial concentration dropped below 100 cfu/plate measured in accordance with the method for determining the MIC as described in the example section.

In the meaning of the present invention, a "MIC reducing compound" is a compound which induces or effects a biocidal activity (e.g. reduction or prevention of the growth and/or accumulation of microorganisms such as bacteria, yeasts and/or moulds) in an aqueous preparation containing a biocide concentration which is below the minimum inhibitory concentration (MIC) of the respective biocide in the absence of the MIC reducing compound (other than a content of dissolved lithium ions which may naturally be present in the aqueous preparation).

Accordingly, the wording "process for reducing the minimum inhibitory concentration (MIC) of a biocide against at least one strain of bacteria and/or at least one strain of yeast and/or at least one strain of mould in an aqueous preparation" means that a biocidal activity of a biocide is induced or effected by the at least one water soluble source of lithium ions leading to a MIC which is below the MIC of the biocide in the absence of the at least one water soluble source of lithium ions.

In the meaning of the present invention, biocides which are "effective" against at least one strain of bacteria and/or at least one strain of yeast and/or at least one strain of mould refer to biocides having the ability to prevent or reduce the growth or accumulation of the at least one strain of bacteria and/or at least one strain of yeast and/or at least one strain of mould in the aqueous preparation when dosed in usual amounts (e.g. as proposed by the supplier of the biocide).

According to the present invention, the wording "prevent or reduce the growth or accumulation" means that no significant growth or accumulation of the at least one strain of bacteria and/or at least one strain of yeast and/or at least one strain of mould is observed in the aqueous preparation when the biocide is present. This preferably leads to a reduction of the cfu value (colony forming unit) in the treated aqueous preparation compared to the preparation immediately before treatment, more preferably to a value of less than 100 cfu/plate and even more preferably to a value of less than 80 cfu/plate using the bacterial count method described in the example section herein.

According to the present invention, a "significant growth or accumulation" of the at least one strain of bacteria and/or at least one strain of yeast and/or at least one strain of mould is observed if the difference, i.e. the growth of the of the at least one strain of bacteria and/or at least one strain of yeast and/or at least one strain of mould is greater than the error associated with the measurement technique when tested within one-week and measured by plate-out on a tryptic soy agar (TSA), where the plates are incubated at 30° C. and evaluated after 48 hours, according to the bacterial count method described in the Example section herein.

According to the present invention, the lithium ion content in the aqueous preparation can be evaluated by filtering off the solids in the suspension by membrane filtration (pore size of 0.2 microns) and measuring the lithium ion content in the filtrate by ion chromatography.

According to the present invention, the content of the at least one biocide in the aqueous phase can be evaluated by HPLC (high pressure liquid chromatography). If necessary, the corresponding biocide may be converted into a derivative before evaluating with HPLC.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that, e.g. an embodiment must be obtained by e.g. the sequence of steps following the term "obtained" even though such a limited understanding is always included by the terms "obtained" or "defined" as a preferred embodiment.

Furthermore, the present invention refers to the use of a water soluble source of lithium ions for reducing the minimum inhibitory concentration (MIC) of a biocide against at least one strain of bacteria and/or at least one strain of yeast and/or at least one strain of mould in an aqueous preparation, wherein the reduction is achieved when the minimum inhibitory concentration (MIC) of the at least one biocide against the at least one strain of bacteria and/or at least one strain of yeast and/or at least one strain of mould fulfils the equation (I), preferably the equation (Ia), more preferably equation (Ib) and most preferably equation (Ic)

$$MIC_{withoutLi}/MIC_{Li} \geq 1.1 \tag{I}$$

$$MIC_{withoutLi}/MIC_{Li} \geq 1.5 \tag{Ia}$$

$$MIC_{withoutLi}/MIC_{Li} \geq 2.0 \tag{Ib}$$

$$MIC_{withoutLi}/MIC_{Li} \geq 4.0 \tag{Ic}$$

wherein
$MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a),
$MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

According to another aspect of the present invention, an aqueous preparation is provided, wherein the aqueous preparation comprises
  a) from 15.0 to 800.0 mMol/L, calculated relative to the weight of water in the aqueous preparation, of lithium ions in the water phase of the aqueous preparation, and
  b) at least one biocide being effective against at least one strain of bacteria and/or at least one strain of yeast and/or at least one strain of mould,
wherein the aqueous preparation comprises the at least one biocide in an amount such that the minimum inhibitory concentration (MIC) of the at least one biocide against the at least one strain of bacteria and/or at least one strain of yeast and/or at least one strain of mould fulfils the equation (I)

$$MIC_{withoutLi}/MIC_{Li}/MIC_{Li} \geq 1.1 \tag{I}$$

where
$MIC_{withoutLi}$ is the minimum inhibitory concentration (MIC) of the at least one biocide against the at least one strain of bacteria and/or at least one strain of yeast and/or at least one strain of mould without the water soluble lithium ions in ppm, calculated relative to the weight of water in the aqueous preparation.
$MIC_{Li}$ is the minimum inhibitory concentration (MIC) of the at least one biocide against the at least one strain of bacteria and/or at least one strain of yeast and/or at least one strain of mould with the water soluble lithium ions in ppm, calculated relative to the weight of water in the aqueous preparation.

When in the following reference is made to preferred embodiments or technical details of the inventive process for reducing the minimum inhibitory concentration (MIC) of a biocide against at least one strain of bacteria and/or at least one strain of yeast and/or at least one strain of mould in an aqueous preparation, it is to be understood that these preferred embodiments or technical details also refer to the inventive aqueous preparation and the inventive use of the water soluble source of lithium ions as defined herein (as far as applicable). If, for example, it is set out that the aqueous preparation of the inventive process preferably comprises at least one inorganic particulate material, also the inventive aqueous preparation as well as the use preferably comprises at least one inorganic particulate material.

According to one embodiment of the present invention, the aqueous preparation of step a) comprises (i) at least one inorganic particulate material, preferably the at least one inorganic particulate material is selected from the group comprising natural ground calcium carbonate, natural and/or synthetic precipitated calcium carbonate, dolomite, kaolin, talcum, aluminium hydroxide, aluminium silicate, titanium dioxide and mixtures thereof, and most preferably the at least one inorganic particulate material comprises natural ground calcium carbonate and/or synthetic precipitated calcium carbonate, and/or (ii) at least one organic material, preferably the at least one organic material is selected from the group comprising carbohydrates such as starch, sugar, cellulose and cellulose based pulp, glycerol, hydrocarbons and mixtures thereof.

According to another embodiment of the present invention, the aqueous preparation of step a) and/or of step d) and/or of step e) has (i) pH value of from 2 to 12, preferably from 6 to 12 and more preferably from 7 to 10.5, and/or (ii) solids content of up to 85.0 wt.-%, preferably from 10.0 to 82.0 wt.-%, and more preferably from 20.0 to 80.0 wt.-%, based on the total weight of the aqueous preparation.

According to yet another embodiment of the present invention, the at least one strain of bacteria is selected from the group consisting of gram-negative bacteria, gram-positive bacteria and mixtures thereof.

According to one embodiment of the present invention, (i) the at least one strain of bacteria is selected from the group comprising, *Methylobacterium* sp., *Salmonella* sp., *Escherichia* sp. such as *Escherichia coli*, *Shigella* sp., *Enterobacter* sp., *Pseudomonas* sp. such as *Pseudomonas mendocina*, *Bdellovibrio* sp., *Agrobacterium* sp., *Alcaligenes* sp., *Flavobacterium* sp., *Rhizobium* sp., *Sphingobacterium* sp., *Aeromonas* sp., *Chromobacterium* sp., *Vibrio* sp., *Hyphomicrobium* sp., *Leptothrix* sp., *Micrococcus* sp., *Staphylococcus* sp. such as *Staphylococcus aureus*, *Agromyces* sp., *Acidovorax* sp., and mixtures thereof, and/or (ii) the at least one strain of yeast is selected from the group comprising *Saccharomycotina*, *Taphrinomycotina*, *Schizosaccharomycetes*, *Basidiomycota*, *Agaricomycotina*, *Tremellomycetes*, *Pucciniomycotina*, *Microbotryomycetes*, *Candida* sp. such as *Candida albicans*, *Candida tropicalis*, *Candida stellatoidea*, *Candida glabrata*, *Candida krusei*, *Candida guilliermondii*, *Candida viswanathii*, *Candida lusitaniae* and mixtures thereof, *Yarrowia* sp. such as *Yarrowia lipolytica*, *Cryptococcus* sp. such as *Cryptococcus gattii* and *Cyptococcus neofarmans*, *Zygosaccharomyces* sp., *Rhodotorula* sp. such as *Rhodotorula mucilaginosa*, and mixtures thereof, and/or (iii) the at least one strain of mould is selected from the group comprising of *Acremonium* sp., *Alternaria* sp., *Aspergillus* sp., *Cladosporium* sp., *Fusarium* sp., *Mucor* sp., *Penicillium* sp., *Rhizopus* sp., *Stachybotrys* sp., *Trichoderma* sp., *Dematiaceae* sp., *Phoma* sp., *Eurotium* sp., *Scopulariopsis* sp., *Aureobasidium* sp., *Monilia* sp., *Botrytis* sp., *Stemphylium* sp., *Chaetomium* sp., *Mycelia* sp., *Neurospora* sp., *Ulocladium* sp., *Paecilomyces* sp., *Wallemia* sp., *Curvularia* sp., and mixtures thereof.

According to another embodiment of the present invention, the at least one biocide of step b) is selected from the group comprising phenols, halogenated phenols, halogen-containing compounds, halogen-releasing compounds, isothiazolinones, aldehyde-containing compounds, aldehyde-releasing compounds, guanidines, sulphones, thiocyanates, pyrithiones, antibiotics such as β-lactam antibiotics, quaternary ammonium salts, peroxides, perchlorates, amides, amines, heavy metals, biocidal enzymes, biocidal polypeptides, azoles, carbamates, glyphosates, sulphonamides and mixtures thereof.

According to yet another embodiment of the present invention, the at least one water soluble source of lithium ions is at least one lithium salt, preferably the at least one lithium salt is selected from lithium carbonate, lithium chloride, lithium hydroxide, lithium phosphate, lithium citrate, lithium maleate, lithium acetate and lithium lactate, polymeric salts of lithium and mixtures thereof, said polymeric salt of lithium is preferably selected from lithium salts of acrylic homopolymers, acrylic copolymers such as copolymers of acrylic acid and maleic acid and/or acrylamide, polyphosphates and mixtures thereof, said polymeric salt of lithium is more preferably $Li_2Na_2$polyphosphate, lithium-sodium hexamethaphosphate or lithium polyacrylate.

According to one embodiment of the present invention, step d) is carried out in that the at least one biocide is added to the aqueous preparation (i) in an amount being at least 9%, preferably at least 33%, more preferably at least 50% and most preferably at least 75%, below the minimum inhibitory concentration (MIC) of the at least one biocide for the at least one strain of bacteria and/or at least one strain of yeast and/or at least one strain of mould, and/or (ii) in an amount of from 0.5 ppm to 6 000 ppm, calculated relative to the weight of water in the aqueous preparation.

According to another embodiment of the present invention, step e) is carried out such that the minimum inhibitory concentration (MIC) of the at least one biocide against the at least one strain of bacteria and/or at least one strain of yeast and/or at least one strain of mould fulfils the equation (Ia), preferably equation (Ib) and most preferably equation (Ic)

$$MIC_{withoutLi}/MIC_{Li} \geq 1.5 \qquad (Ia)$$

$$MIC_{withoutLi}/MIC_{Li} \geq 2.0 \qquad (Ib)$$

$$MIC_{withoutLi}/MIC_{Li} \geq 4.0 \qquad (Ic)$$

wherein
$MIC_{withoutLi}$ is the minimum inhibitory concentration (MIC) of the biocide against the at least one strain of bacteria and/or at least one strain of yeast and/or at least one strain of mould without the at least one water soluble source of lithium ions in ppm calculated relative to the weight of water in the aqueous preparation of step a),
$MIC_{Li}$ is the minimum inhibitory concentration (MIC) of the biocide against the at least one strain of bacteria and/or at least one strain of yeast and/or at least one strain of mould with the at least one water soluble source of lithium ions in ppm calculated relative to the weight of water in the aqueous preparation of step a).

According to yet another embodiment of the present invention, step e) is carried out in that the at least one water soluble source of lithium ions is added to the aqueous preparation in an amount such that the total amount of lithium ions in the water phase of the aqueous preparation is from 15.0 to 700.0 mMol/L, calculated relative to the weight of water in the preparation.

According to one embodiment of the present invention, step e) is carried out before step d).

According to another embodiment of the present invention, step d) and/or step e) is/are repeated one or more times.

According to yet another embodiment of the present invention, the aqueous preparation of step d) and/or e) is/are free of aldehyde-releasing and/or aldehyde-based biocides in an amount of 250.0 to 5 000.0 ppm, calculated relative to the weight of water in the preparation, when strains of bacteria which are resistant to, tolerant to and/or degrade aldehyde-releasing and/or aldehyde-based biocides are present in the aqueous preparation.

As set out above, the inventive process for reducing the minimum inhibitory concentration (MIC) of a biocide against at least one strain of bacteria and/or at least one strain of yeast and/or at least one strain of mould in an aqueous preparation comprises the steps a), b), c), d) and e). In the following, it is referred to further details of the present invention and especially the foregoing steps of the inventive process for reducing the minimum inhibitory concentration (MIC) of a biocide against at least one strain of bacteria and/or at least one strain of yeast and/or at least one strain of mould in an aqueous preparation. Those skilled in the art will understand that many embodiments described herein can be combined or applied together.

Characterisation of Step a): Provision of an Aqueous Preparation

According to step a) of the process of the present invention, an aqueous preparation is provided.

It is appreciated that the aqueous preparation provided in step a) of the instant process can be any aqueous preparation that requires biocidal activity, i.e. reduction or prevention of the growth and/or accumulation of at least one strain of bacteria and/or at least one strain of yeast and/or at least one strain of mould.

The term "aqueous" preparation refers to a system, wherein the liquid phase of the preparation comprises, preferably consists of, water. However, said term does not exclude that the aqueous preparation comprises an organic solvent selected from the group comprising alcohols such as methanol, ethanol, isopropanol, carbonyl-group containing solvents such as ketones, e.g. acetone or aldehydes, esters such as isopropyl acetate, carboxylic acids such as formic acid, sulphoxides such as dimethyl sulphoxide and mixtures thereof. If the aqueous preparation comprises an organic solvent, the aqueous preparation comprises the organic solvent in an amount up to 40.0 wt.-% preferably from 1.0 to 30.0 wt.-% and most preferably from 1.0 to 25.0 wt.-%, based on the total weight of the liquid phase of the aqueous preparation. For example, the liquid phase of the aqueous preparation consists of water. If the liquid phase of the aqueous preparation consists of water, the water to be used can be any water available such as tap water and/or deionised water.

The aqueous preparation of step a) can be an aqueous solution or an aqueous suspension. In one embodiment of the present invention, the aqueous preparation of step a) is an aqueous suspension.

The term "aqueous solution" in the meaning of the present invention refers to systems in which no discrete solid particles are observed in the solvent, i.e. in case a further material, such as at least one organic material, are present, a solution with water is formed, wherein the possible particles of the further material are dissolved in the solvent.

The term "aqueous suspension" in the meaning of the present invention refers to a system comprising solvent and at least one inorganic particulate material and/or at least one organic material, wherein at least a part of the particles of the at least one inorganic particulate material and/or the at least one organic material are present as insoluble solids in the solvent.

The aqueous preparation provided in step a) preferably comprises at least one inorganic particulate material.

The term "at least one" inorganic particulate material in the meaning of the present invention means that the inorganic particulate material comprises, preferably consists of, one or more inorganic particulate materials.

In one embodiment of the present invention, the at least one inorganic particulate material comprises, preferably consists of, one inorganic particulate material. Alternatively, the at least one inorganic particulate material comprises, preferably consists of, two or more inorganic particulate materials. For example, the at least one inorganic particulate material comprises, preferably consists of, two or three inorganic particulate material. Preferably, the at least one inorganic particulate material comprises, preferably consists of, one inorganic particulate material.

For example, the at least one inorganic particulate material is selected from the group comprising natural ground calcium carbonate, natural and/or synthetic precipitated calcium carbonate, dolomite, kaolin, talcum, aluminium hydroxide, aluminium silicate, titanium dioxide and mixtures thereof.

In one embodiment of the present invention, the at least one inorganic particulate material comprises natural ground calcium carbonate and/or synthetic precipitated calcium carbonate.

"Ground calcium carbonate" (GCC) in the meaning of the present invention is a calcium carbonate obtained from natural sources, such as limestone, marble or chalk, and processed through a treatment such as grinding, screening and/or fractionizing by wet and/or dry, for example by a cyclone or classifier.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water.

The natural ground calcium carbonate and/or synthetic precipitated calcium carbonate may additionally be surface treated, for example with fatty acids such as stearic acid and corresponding calcium salts.

If the aqueous preparation provided in step a) comprises at least one inorganic particulate material, the at least one inorganic particulate material may have a particle size distribution as conventionally employed for the material(s) involved in the type of product to be produced. In general, 90% of the particles will have an esd (equivalent spherical diameter as measured by the well known technique of sedimentation using Sedigraph 5100 series, Micromeritics) of less than 5 micrometres (μm). Coarse inorganic particulate materials may have a particle esd generally (i.e., at least 90 wt.-%) in the range of 1 to 5 microns. Fine inorganic particulate materials may have a particle esd generally less than 2 μm, e.g. 50.0 to 99.0 wt.-% less than 2 μm and preferably 60.0 to 90.0 wt.-% less than 2 μm. It is preferred that the at least one inorganic particulate material in the aqueous preparation has a weight median particle size $d_{50}$ value of from 0.1 to 5 μm, preferably from 0.2 to 2 μm and most preferably from 0.35 to 1 µm, for example 0.7 µm as measured using a Sedigraph™ 5100 of Micromeritics Instrument Corporation.

For keeping such inorganic particulate materials dispersed in an aqueous preparation and thus ensuring that the viscosity of the preparation remains substantially the same over time, additives such as dispersing agents can be used. A suitable dispersing agent according to the present invention is preferably a homo- or copolymer made of monomers and/or co-monomers selected from the group consisting of acrylic acid, methacrylic acid, itaconic acid, crotonic acid, fumaric acid, maleic anhydride acid, isocrotonic acid, aconitic acid (cis or trans), mesaconic acid, sinapinic acid, undecylenic acid, angelic acid, canellic acid, hydroxyacrylic acid, acrolein, acrylamide, acrylonitrile, dimethylaminoethyl methacrylate, vinylpyrrolidone, styrene, the esters of acrylic and methacrylic acids and mixtures thereof, wherein salts of poly(acrylic acid) and/or poly (methacrylic acid) are preferred as dispersing agent.

Additionally or alternatively, the aqueous preparation of step a) comprises at least one organic particulate material. For example, the at least one organic material is selected from the group comprising, glycols, carbohydrates such as CMC or starch, cellulose and cellulose based pulp, glycerol and mixtures thereof.

In one embodiment of the present invention, the aqueous preparation of step a) comprises at least one inorganic particulate material, preferably being selected from the group comprising natural ground calcium carbonate, natural and/or synthetic precipitated calcium carbonate, dolomite, kaolin, talcum, aluminium hydroxide, aluminium silicate, titanium dioxide and mixtures thereof, and most comprising natural ground calcium carbonate and/or synthetic precipitated calcium carbonate Thus, the aqueous preparation of step a) is preferably an aqueous suspension.

It is appreciated that the solids content of the aqueous preparation provided in step a) can be up to 85.0 wt.-%. For example, the solids content of the aqueous preparation is from 10.0 to 82.0 wt.-%, and more preferably from 20.0 to 80.0 wt.-%, based on the total weight of the aqueous preparation.

The total solids content in the meaning of the present application corresponds to the residual weight of the aqueous preparation after drying for 3 hours at 105° C. as measured in a sample of at least 3 g to 5 g.

The pH of the aqueous preparation provided in step a) can vary in a broad range and is preferably in a pH range typically observed for such aqueous preparations. It is thus appreciated that the aqueous preparation of step a) preferably has a pH value of from 2 to 12. For example, the aqueous preparation of step a) has a pH value of from 6 to 12 and more preferably from 7 to 10.5.

Typically, the aqueous preparations provided in step a) has a viscosity being preferably in the range from 50 to 2 000 mPa·s and preferably from 80 to 800 mPa·s, as measured with a Brookfield DV-II Viscometer at a speed of 100 rpm and equipped with a LV-3 spindle.

The aqueous preparations according to the invention can be produced by methods known in the art, by for example, dispersing, suspending or slurring water-insoluble solids, preferably inorganic particulate materials with, if appropriate, addition of a dispersing agent and, if appropriate, further additives in water.

Characterisation of Step b): Providing at Least One Biocide

According to step b) of the process of the present invention, at least one biocide is provided.

The term "at least one" biocide in the meaning of the present invention means that the biocide comprises, preferably consists of, one or more biocides.

In one embodiment of the present invention, the at least one biocide comprises, preferably consists of, one biocide. Alternatively, the at least one biocide comprises, preferably consists of, two or more biocides. For example, the at least one biocide comprises, preferably consists of, two or three biocides. Preferably, the at least one biocide comprises, preferably consists of, two or more biocides.

The biocide suitable for the present invention may be any biocide being effective against at least one strain of bacteria and/or at least one strain of yeast and/or at least one strain of mould in the aqueous preparation at the minimum inhibitory concentration of the biocide in the absence of the MIC reducing compound, i.e. the at least one water soluble source of lithium ions.

Preferred biocides according to the present invention include biocides being selected from the group comprising phenols, halogenated phenols, halogen-containing compounds, halogen-releasing compounds, isothiazolinones, aldehyde-containing compounds, aldehyde-releasing compounds, guanidines, sulphones, thiocyanates, pyrithiones, antibiotics such as β-lactam antibiotics, quaternary ammonium salts, peroxides, perchlorates, amides, amines, heavy metals, biocidal enzymes, biocidal polypeptides, azoles, carbamates, glyphosates, sulphonamides and mixtures thereof.

The phenol biocide of the present invention is preferably 2-phenylphenol (OPP) (CAS NO 90-43-7) and/or 2-phenylphenol (OPP) in the form of the alkali metal salt such as the sodium salt (CAS NO 132-27-4) or potassium salt (CAS NO 13707-65-8).

For example, the dosage recommendation by commercial suppliers of such phenol biocides in the absence of a MIC reducing compound is typically from 1 500 to 6 000 ppm (w/w) active biocide per aqueous preparation having a 75 wt.-% solids content of calcium carbonate.

The halogenated phenol biocide of the present invention is preferably 4-chloro-3-methylphenol (CAS NO 59-50-7) and/or 4-chloro-2-methylphenol (CAS NO 1570-64-5).

For example, the dosage recommendation by commercial suppliers of such a halogenated phenol biocide in the absence of a MIC reducing compound is typically from 3 900 to 25 000 ppm (w/w) active biocide per aqueous preparation having a 75 wt.-% solids content of calcium carbonate.

The biocide being a halogen-containing or halogen-releasing compound is preferably selected from bronopol (CAS NO 52-51-7), bronidox (CAS NO 30007-47-7), 2,2-dibrom-3-nitrilpropionamid (DBNPA) (CAS NO 10222-01-2), 1,2-dibromo-2,4-dicyanobutane (CAS NO 35691-65-7), monochloroamine (CAS NO 10599-90-3), ammonium bromide (CAS NO 12124-97-9), calcium hypochlorite (CAS NO 7778-54-3), iodine (CAS NO 7553-56-2), tri-iodide (CAS NO 14900-04-0), potassium iodate (CAS NO 7758-05-6) and mixtures thereof.

In accordance with the present invention, a "halogen-containing biocide" refers to a biocide which has one or more halogen-groups. In accordance with the present invention, a "halogen-releasing biocide" refers to a compound which is able to release or transfer a halogen group.

For example, the dosage recommendation by commercial suppliers of such a halogen-containing or halogen-releasing compound (e.g. bronopol) in the absence of a MIC reducing compound is typically from 300 to 1 500 ppm (w/w) active biocide per aqueous preparation having a 75 wt.-% solids content of calcium carbonate.

The isothiazolinone biocide is preferably selected from the group comprising isothiazolinone (IT) (CAS NO 1003-07-2), benzisothiazolinone (BIT) (CAS NO 2634-33-5), 5-chloro-2-methyl-2H-isothiazolin-3-one (CMIT) (CAS NO 26172-55-4), 2-methyl-2H-isothiazolin-3-one (MIT) (CAS NO 2682-20-4), octylisothiazolinone (OIT) (CAS NO 26530-20-1), dichlorooctylisothiazolinone (DOIT) (CAS NO 64359-81-5) and mixtures thereof. For example, the isothiazolinone biocide CMIT/MIT (CAS NO 55965-84-9) is a mixture of 5-chloro-2-methyl-2H-isothiazolin-3-one (CMIT) and 2-methyl-2H-isothiazolin-3-one (MIT) at a weight ratio of 3:1.

For example, the dosage recommendation by commercial suppliers of such an isothiazolinone biocide in the absence of a MIC reducing compound is typically from 25 to 1 500 ppm (w/w) active biocide per aqueous preparation having a 75 wt.-% solids content of calcium carbonate. For example, the dosage recommendation by commercial suppliers of benzisothiazolinone (BIT) in the absence of a MIC reducing compound is typically from 240 to 1 500 ppm (w/w) active biocide per aqueous preparation having a 75 wt.-% solids content of calcium carbonate. For example, the dosage recommendation by commercial suppliers of 2-methyl-2H-isothiazolin-3-one (MIT) in the absence of a MIC reducing compound is typically from 75 to 450 ppm (w/w) active biocide per aqueous preparation having a 75 wt.-% solids content of calcium carbonate. If a mixture of 5-chloro-2-methyl-2H-isothiazolin-3-one (CMIT) and 2-methyl-2H-isothiazolin-3-one (MIT) (weight ratio of 3:1) is used as biocide, the dosage recommendation by commercial suppliers of said mixture in the absence of a MIC reducing compound is typically from 27 to 99 ppm (w/w) active biocide per aqueous preparation having a 75 wt.-% solids content of calcium carbonate.

The aldehyde-containing compound is preferably selected from the group comprising formaldehyde (CAS NO 50-00-0), acetaldehyde, glyoxal, glutaraldehyde (CAS NO 111-30-8), 2-propenal, phthalic dialdehyde and mixtures thereof, and preferably is formaldehyde, glutaraldehyde or mixtures thereof.

In accordance with the present invention, an "aldehyde-containing biocide" refers to a biocide which has one or more aldehyde-group.

For example, the dosage recommendation by commercial suppliers of such an aldehyde-containing compound in the absence of a MIC reducing compound is typically from 300 to 3 000 ppm (w/w) active biocide per aqueous preparation having a 75 wt.-% solids content of calcium carbonate. For example, the dosage recommendation by commercial suppliers of Glutaraldehyde in the absence of a MIC reducing compound is typically from 300 to 3000 ppm (w/w) active biocide per aqueous preparation having a 75 wt.-% solids content of calcium carbonate.

The aldehyde-releasing biocide is preferably selected from the group comprising formaldehyde-releasing biocides, acetaldehyde-releasing biocides, succinaldehyde-releasing biocides, 2-propenal-releasing biocides and mixtures thereof, preferably from formaldehyde-releasing biocides. The formaldehyde-releasing biocide is preferably selected from the group comprising benzyl alcoholmono(poly)-hemiformal (CAS NO 14548-60-8), tetramethylolacetylenediurea (CAS NO 5395-50-6), thiadiazinethione-tetrahydrodimethyl (DAZOMET) (CAS NO 533-74-4), (ethylenedioxy) dimethanol (EDDM) (CAS NO 3586-55-8), 2-chloro-N-(hydroxymethyl)acetamide (CAS NO 2832-19-1), dimethyloxazolidine (DMO) (CAS NO 51200-87-4), hexamethylenetetramine (CAS NO 100-97-0), bis[tetrakis(hydroxymethyl)phosphonium] sulphate (THPS) (CAS NO 55566-30-8), 1-(cis-3-chloroallyl)-3,5,7-triaza-1-azoniaadamantane chloride (CAS NO 51229-78-8), hexahydro-1,3,5-tris(hydroxyethyl)-s-triazine (CAS NO 4719-04-4) and mixtures thereof.

In accordance with the present invention, an "aldehyde-releasing biocide" refers to a compound which is able to release mono- di-, and/or tri-aldehyde.

For example, the dosage recommendation by commercial suppliers of such an aldehyde-releasing compound in the absence of a MIC reducing compound is typically from 375 to 750 ppm (w/w) active biocide, e.g. for DAZOMET per aqueous preparation having a 75 wt.-% solids content of calcium carbonate.

The guanidine biocide is preferably selected from guanidinedodecyl monochloride (CAS NO 13590-97-1) and/or polyethoxyethoxyethylguanidinium hexachloride (CAS NO 374572-91-5). The sulphone biocide is preferably hexachlorodimethyl sulfone (CAS NO 3064-70-8) and/or 4,4'-Diaminodiphenylsulfone (CAS NO 80-08-0). The thiocyanate biocide is preferably methylene bis(thiocyanate) (CAS NO 6317-18-6) and/or (Benzothiazol-2-ylthio)methylthiocyanate (CAS NO 21564-17-0). The biocide being an antibiotic is preferably selected from β-lactam antibiotics such as penicillin G (CAS NO 69-57-8) and/or ampicillin (CAS NO 69-53-4) and/or biapenem (CAS NO 120410-24-4) and/or cefixime (CAS NO 79350-37-1). The amide biocide is preferably 2,2-dibromo-3-nitrilopropionamide (DBNPA) (CAS NO 10222-01-2). The azole biocide can be preferably selected from climbazole (CAS NO 38083-17-9), miconazole (CAS NO 22916-47-8), clotrimazole (CAS NO 23593-75-1), and mixtures thereof including the biocides in the form of a salt such as miconazole nitrate (CAS NO 22832-87-7). The carbamate biocide can be preferably selected from iodopropynyl butylcarbamate (CAS NO 55406-53-6), aldicarb (CAS NO 116-06-3), carbofuran (CAS NO 1563-66-2) and mixtures thereof. The glyphosate biocide is preferably selected from N-(phosphonomethyl) glycin (CAS NO 1071-83-6) and/or N-(phosphonomethyl) glycin in the form of the salt such as the ammonium salt or isopropylammonium salt (CAS NO 40465-66-5 and CAS NO 38641-94-0).

The pyrithione biocide is preferably sodium pyrithione (CAS NO 3811-73-2) and/or zinc pyrithione (CAS NO 13463-41-7).

For example, the dosage recommendation by commercial suppliers of such a pyrithione biocide in the absence of a MIC reducing compound is typically from 600 to 1 500 ppm (w/w) active biocide per aqueous preparation having a 75 wt.-% solids content of calcium carbonate.

The at least one biocide can be further preferably selected from quaternary ammonium salts, peroxides, perchlorates, tributyl tin, heavy metals, biocidal enzymes, biocidal polypeptides, sulphonamides and mixtures thereof.

In one embodiment of the present invention, the at least one biocide is in an undiluted, i.e. concentrated form. In another embodiment of the present invention, the at least one biocide is diluted to a suitable concentration before being contacted with the aqueous preparation in step d). In the diluted form, the at least one biocide is preferably dissolved in water, wherein the corresponding diluted composition comprises preferably up to 99.0 wt.-% of the at least one biocide, based on the total weight of the composition. More preferably, the composition in water comprises 1.0 to 95.0 wt.-% of the at least one biocide and most preferably 1.0 to 85.0 wt.-% of the at least one biocide, based on the total weight of the composition, whereby the composition may further comprise suitable stabilizers.

In one embodiment of the present invention, the at least one biocide is free of aldehyde-releasing and/or aldehyde-based biocides in an amount of 250.0 to 5 000.0 ppm, calculated relative to the weight of water in the preparation, when strains of bacteria which are resistant to, tolerant to and/or degrade aldehyde-releasing and/or aldehyde-based biocides are present in the aqueous preparation. Preferably, the at least one biocide is free of aldehyde-releasing and/or aldehyde-based in an amount sufficient to be effective against strains of bacteria which are resistant to, tolerant to and/or degrade aldehyde-releasing and/or aldehyde-based biocides in the aqueous preparation, when such strains of bacteria are present in the aqueous preparation. Accordingly, also the aqueous preparation obtained after step d) and/or e) of the instant process is preferably free of aldehyde-releasing and/or aldehyde-based biocides in an amount of 250.0 to 5 000.0 ppm, calculated relative to the weight of water in the preparation, when strains of bacteria which are resistant to, tolerant to and/or degrade aldehyde-releasing and/or aldehyde-based biocides are present in the aqueous preparation. More preferably, the aqueous preparation obtained after step d) and/or e) of the instant process is free of aldehyde-releasing and/or aldehyde-based biocides in an amount sufficient to be effective against strains of bacteria which are resistant to, tolerant to and/or degrade aldehyde-releasing and/or aldehyde-based biocides in the aqueous preparation, when such strains of bacteria are present in the aqueous preparation.

Characterisation of Step c): Providing at Least One Water Soluble Source of Lithium Ions According to step c) of the process of the present invention, at least one water soluble source of lithium ions is provided.

The term "at least one" water soluble source of lithium ions in the meaning of the present invention means that the water soluble source of lithium ions comprises, preferably consists of, one or more water soluble sources of lithium ions.

In one embodiment of the present invention, the at least one water soluble source of lithium ions comprises, preferably consists of, one water soluble source of lithium ions. Alternatively, the at least one water soluble source of lithium ions comprises, preferably consists of, two or more water soluble sources of lithium ions. For example, the at least one water soluble source of lithium ions comprises, preferably consists of, two or three water soluble sources of lithium ions. Preferably, the at least one water soluble source of lithium ions comprises, preferably consists of, two or more water soluble sources of lithium ions.

It is appreciated that the at least one water soluble source of lithium ions provided in step c) of the instant process can be any lithium ion-comprising compound that is soluble in water. Accordingly, the term "water-soluble" lithium ion source or "soluble in water" in the meaning of the present invention refers to systems in which at least a part of the lithium ion source forms a solution with water, i.e. at least a part of the particles of the at least one source of lithium ions are dissolved in the solvent. In particular, the at least one source of lithium ions is considered as being "water-soluble" if at least a part of the at least one source of lithium ions provided in step c) forms lithium ions which are dissolved in the water phase of the aqueous preparation.

The term at least one water soluble "source of lithium ions" in the meaning of the present invention refers to a compound that comprises lithium ions, i.e. lithium cations.

In one embodiment of the present invention, the at least one water soluble source of lithium ions is preferably provided in the form of at least one lithium salt. Preferably the anionic group of the at least one lithium salt is selected from the group comprising carbonate, chloride, hydroxide, phosphate, citrate, maleate, acetate, lactate, sulphate, nitrate and mixtures thereof. In particular, the at least one lithium salt is selected from lithium carbonate, lithium chloride, lithium hydroxide, lithium phosphate, lithium citrate, lithium maleate, lithium acetate and lithium lactate are especially preferred as the MIC reducing compound of the present invention.

For example, the at least one water soluble source of lithium ions is preferably lithium carbonate (CAS NO. 554-13-2), lithium citrate (CAS NO. 919-16-4) or lithium hydroxide (CAS NO. 1310-65-2).

In one embodiment of the present invention, the at least one water soluble source of lithium ions is free of lithium fluoride. Accordingly, it is preferred that also the aqueous preparation obtained after step d) and/or e) of the instant process is/are free of lithium fluoride, i.e. fluoride ions.

It is to be noted that the aforementioned embodiment reflect the amount of fluoride ions being added via the at least one water soluble source of lithium ions to an aqueous preparation and does not cover any dissolved fluoride ions which may naturally be present in the aqueous preparation. However, the amount of dissolved naturally occurring fluoride ions in, e.g. a calcium carbonate slurry usually is neglectable and well below 0.5 ppm, based on the pigment content of the slurry.

Additionally or alternatively, the at least one water soluble source of lithium ions can be introduced into the aqueous preparation via a polymeric salt of lithium, such as acrylic homopolymers, acrylic copolymers such as copolymers of acrylic acid and maleic acid and/or acrylamide, polyphosphates and mixtures thereof having multiple acidic sites which can be partially or totally neutralised with lithium ions. The polymeric salt of lithium is preferably selected from $Li_2Na_2$polyphosphate, lithium-sodium hexametaphosphate or lithium polyacrylate.

The polymeric salt of lithium which may be provided in step c) of the instant invention is preferably partially or completely neutralized, preferably to a degree of 5.0 to 100.0%, preferably to a degree of 25.0 to 100.0% and most preferably to a degree of 75.0 to 100.0% using a neutralizing agent containing ions of lithium and, optionally other alkali metals and/or alkaline earth metals. In one embodiment the acidic sites of the polymeric salt of lithium are neutralized using a neutralizing agent containing only lithium. Neutralized polyacrylates and/or polymethacrylates with an average molecular weight of not more than 50 000, preferably with an average molecular weight in the range from 1 000 to 25 000 and more preferably in the range from 3 000 to 12 000 are especially suitable.

In general, the at least one water soluble source of lithium ions can be provided in form of an aqueous solution, aqueous dispersion or a dry material. If the at least one water soluble source of lithium ions is provided in form of an aqueous solution, the aqueous solution comprises the at least one water soluble source of lithium in an amount from 1.0 to 45.0 wt.-%, preferably from 5.0 to 25.0 wt.-%, based on the total weight of the aqueous solution.

If the at least one water soluble source of lithium ions is provided in form of an aqueous dispersion, the aqueous dispersion comprises the at least one water soluble source of lithium in an amount from 1.0 to 60.0 wt.-%, preferably from 5.0 to 50.0 wt.-% and more preferably from 15.0 to 45.0 wt.-% based on the total weight of the aqueous dispersion.

Preferably, the at least one water soluble source of lithium ions is provided in the form an aqueous solution.

Characterisation of Step d): Contacting the Aqueous Preparation with the at Least One Biocide According to step d) of the process of the present invention, the aqueous preparation of step a) is contacted with the at least one biocide of step b). It is one requirement of the instant invention that the at least one biocide of step b) is effective against at least one strain of bacteria and/or at least one strain of yeast and/or at least one strain of mould when present in the aqueous preparation.

It is thus appreciated that the at least one biocide is effective against at least one strain of bacteria and/or at least one strain of yeast and/or at least one strain of mould in the aqueous preparation when the at least one biocide is present. This either prevents the growth or accumulation of the at least one strain of bacteria and/or at least one strain of yeast and/or at least one strain of mould or leads to a reduction of the cfu value (colony forming unit) in the treated aqueous preparation.

In one embodiment of the present invention, the at least one strain of bacteria is selected from the group consisting of gram-negative bacteria, gram-positive bacteria and mixtures thereof.

It is appreciated that gram-positive and gram-negative bacteria are well known in the art and are e.g. described in Biology of Microorganisms, "Brock", Madigan M T, Martinko J M, Parker J, 1997, 8$^{th}$ Edition. In particular, such bacteria represent evolutionary very distantly related classes of bacteria each comprising of many bacterial families. Gram negative bacteria are characterized by two membranes (outer and inner membrane) while gram positive bacteria contain only one membrane. Usually, the former contains a high amount of lipopolysaccharide and a thin single-layer of peptidoglycan, while the latter has virtually no lipopolysaccharide, a multi-layered thick peptidocglycan and the coat contains teichoic acids. For these differences the Gram positive and Gram negative bacteria react differently on environmental influences. Methods for discriminating gram-positive and gram-negative bacteria include species identification by DNA sequencing techniques or biochemical characterizations. Alternatively, the number of membranes can be determined directly by thin section transmission electron microscopy.

The term "at least one strain of bacteria" in the meaning of the present invention means that the strain of bacteria comprises, preferably consists of, one or more strains of bacteria.

In one embodiment of the present invention, the at least one strain of bacteria comprises, preferably consists of, one strain of bacteria. Alternatively, the at least one strain of bacteria comprises, preferably consists of, two or more strains of bacteria. For example, the at least one strains of bacteria comprises, preferably consists of, two or three strains of bacteria. Preferably, the at least one strain of bacteria comprises, preferably consists of, two or more strains of bacteria.

For example, the at least one strain of bacteria is selected from the group comprising *Methylobacterium* sp., *Salmonella* sp., *Escherichia* sp. such as *Escherichia coli*, *Shigella* sp., *Enterobacter* sp., *Pseudomonas* sp. such as *Pseudomonas mendocina*, *Bdellovibrio* sp., *Agrobacterium* sp., *Alcaligenes* sp., *Flavobacterium* sp., *Rhizobium* sp., *Sphingobacterium* sp., *Aeromonas* sp., *Chromobacterium* sp., *Vibrio* sp., *Hyphomicrobium* sp., *Leptothrix* sp., *Micrococcus* sp., *Staphylococcus* sp. such as *Staphylococcus aureus*, *Agromyces* sp., *Acidovorax* sp., and mixtures thereof.

For example, the at least one strain of bacteria is selected from *Escherichia* sp. such as *Escherichia coli*, *Staphylococcus* sp. such as *Staphylococcus aureus*, and mixtures thereof.

Additionally or alternatively, the at least one strain of yeast is selected from the group comprising *Saccharomycotina*, *Taphrinomycotina*, *Schizosaccharomycetes*, *Basidiomycota*, *Agaricomycotina*, *Tremellomycetes*, *Pucciniomycotina*, *Microbotryomycetes*, *Candida* sp. such as *Candida albicans*, *Candida tropicalis*, *Candida stellatoidea*, *Candida glabrata*, *Candida krusei*, *Candida guilliermondii*, *Candida viswanathii*, *Candida lusitaniae* and mixtures thereof *Yarrowia* sp. such as *Yarrowia lipolytica*, *Cryptococcus* sp. such as *Cryptococcus gattii* and *Cryptococcus neofarmans*, *Zygosaccharomyces* sp., *Rhodotorula* sp. such as *Rhodotorula mucilaginosa*, and mixtures thereof.

The term "at least one strain of yeast" in the meaning of the present invention means that the strain of yeast comprises, preferably consists of, one or more strains of yeast.

In one embodiment of the present invention, the at least one strain of yeast comprises, preferably consists of, one strain of yeast. Alternatively, the at least one strain of yeast comprises, preferably consists of, two or more strains of yeast. For example, the at least one strains of yeast comprises, preferably consists of, two or three strains of yeast. Preferably, the at least one strain of yeast comprises, preferably consists of, two or more strains of yeast.

Additionally or alternatively, the at least one strain of mould is selected from the group comprising of *Acremonium* sp., *Alternaria* sp., *Aspergillus* sp., *Cladosporium* sp., *Fusarium* sp., *Mucor* sp., *Penicillium* sp., *Rhizopus* sp., *Stachybotrys* sp., *Trichoderma* sp., *Dematiaceae* sp., *Phoma* sp., *Eurotium* sp., *Scopulariopsis* sp., *Aureobasidium* sp., *Monilia* sp., *Botrytis* sp., *Stemphylium* sp., *Chaetomium* sp., *Mycelia* sp., *Neurospora* sp., *Ulocladium* sp., *Paecilomyces* sp., *Wallemia* sp., *Curvularia* sp., and mixtures thereof.

The term "at least one strain of mould" in the meaning of the present invention means that the strain of mould comprises, preferably consists of, one or more strains of mould.

In one embodiment of the present invention, the at least one strain of mould comprises, preferably consists of, one strain of mould. Alternatively, the at least one strain of mould comprises, preferably consists of, two or more strains of mould. For example, the at least one strains of mould comprises, preferably consists of, two or three strains of mould. Preferably, the at least one strain of mould comprises, preferably consists of, two or more strains of mould.

It is preferred that the at least one biocide is effective against at least one strain of bacteria and at least one strain of yeast and at least one strain of mould when present in the aqueous preparation.

Alternatively, the at least one biocide is effective against at least one strain of bacteria or at least one strain of yeast or at least one strain of mould when present in the aqueous preparation.

Alternatively, the at least one biocide is effective against at least one strain of bacteria and at least one strain of yeast or at least one strain of mould when present in the aqueous preparation or the at least one biocide is effective against at least one strain of bacteria or at least one strain of yeast and at least one strain of mould when present in the aqueous preparation.

In one embodiment of the present invention, the at least one biocide is free of aldehyde-releasing and/or aldehyde-based biocides in an amount of 250.0 to 5 000.0 ppm, calculated relative to the weight of water in the preparation, when strains of bacteria which are resistant to, tolerant to and/or degrade aldehyde-releasing and/or aldehyde-based biocides are present in the aqueous preparation. Preferably, the at least one biocide is free of aldehyde-releasing and/or aldehyde-based in an amount sufficient to be effective against strains of bacteria which are resistant to, tolerant to and/or degrade aldehyde-releasing and/or aldehyde-based biocides in the aqueous preparation, when such strains of bacteria are present in the aqueous preparation.

In the meaning of the present invention, strains of bacteria which are "resistant to" refer to bacteria having the ability to withstand the effects of aldehyde-releasing biocides and/or aldehyde-based biocides when dosed in an amount such that the total amount of the aldehyde-releasing biocides and/or aldehyde-based biocides in the aqueous preparation is from 250.0 ppm to 5 000.0 ppm, calculated relative to the amount of water in the preparation. In the meaning of the present invention, strains of bacteria which are "tolerant to" refer to bacteria having the ability to survive in the presence of the aldehyde-releasing biocides and/or aldehyde-based biocides without evolving a random mutation. Strains of bacteria which "degrade" said aldehyde-releasing biocides and/or aldehyde-based biocides in the meaning of the present invention correspond to bacteria having the ability to convert said biocides into inactive forms and/or smaller molecules, e.g. by utilising these substrates as intermediates in their pathways.

In general, the aqueous preparation of step a) and the at least one biocide of step b) can be brought into contact by any conventional means known to the skilled person.

It is appreciated that contacting step d) is preferably carried out by adding the at least one biocide of step b) to the aqueous preparation of step a).

In one embodiment of the present invention, the step of contacting the aqueous preparation of step a) with the at least one biocide of step b) is carried out in that the at least one biocide is added to the aqueous preparation under mixing. A sufficient mixing may be achieved by shaking the aqueous preparation or by agitation, which may provide a more thorough mixing. In one embodiment of the present invention, contacting step d) is carried out under agitation to ensure a thorough mixing of the aqueous preparation and the at least one biocide. Such agitation can be carried out continuously or discontinuously.

According to the present invention, the aqueous preparation is contacted with the at least one biocide such that the at least one biocide is present in the water phase of the aqueous preparation in an amount of from 0.4 to 6 500.0 ppm, calculated relative to the weight of water in the aqueous preparation.

For example, contacting step d) is carried out in that the at least one biocide is added to the aqueous preparation in an amount of from 0.5 ppm to 6 000.0 ppm, calculated relative to the weight of water in the aqueous preparation.

Additionally or alternatively, contacting step d) is carried out in that the at least one biocide is added to the aqueous preparation in an amount being at least 9% below the minimum inhibitory concentration (MIC) of the at least one biocide being effective against the at least one strain of bacteria and/or at least one strain of yeast and/or at least one strain of mould in the absence of the MIC reducing compound, i.e. the at least one water soluble source of lithium ions.

For example, contacting step d) is carried out in that the at least one biocide is added to the aqueous preparation in an amount being at least 33%, more preferably at least 50% and most preferably at least 75%, below the minimum inhibitory concentration (MIC) of the at least one biocide for the at least one strain of bacteria and/or at least one strain of yeast and/or at least one strain of mould in the absence of the MIC reducing compound, i.e. the at least one water soluble source of lithium ions.

In one embodiment of the present invention, the aqueous preparation is contacted with the at least one biocide such that the at least one biocide is present in the water phase of the aqueous preparation in an amount of from 0.4 to 6 500.0 ppm, preferably of from 0.5 ppm to 6 000.0 ppm, calculated relative to the weight of water in the aqueous preparation and such that the at least one biocide is added to the aqueous preparation in an amount being at least 9%, preferably at least 33%, more preferably at least 50% and most preferably at least 75%, below the minimum inhibitory concentration (MIC) of the at least one biocide for the at least one strain of bacteria and/or at least one strain of yeast and/or at least one strain of mould in the absence of the MIC reducing compound, i.e. the at least one water soluble source of lithium ions.

It is appreciated that contacting step d) can be repeated one or more times.

The aqueous preparation obtained in step d) preferably has solids content corresponding to the solids content of the aqueous preparation provided in step a). It is thus appreciated that the aqueous preparation obtained in step d) preferably has solids content of up to 85.0 wt.-%. For example, the solids content of the aqueous preparation obtained in step d) is from 10.0 to 82.0 wt.-%, and more preferably from 20.0 to 80.0 wt.-%, based on the total weight of the aqueous preparation obtained in step d).

Additionally or alternatively, the pH of the aqueous preparation obtained in step d) preferably corresponds to the pH of the aqueous preparation provided in step a). It is thus appreciated that the aqueous preparation obtained in step d) preferably has a pH value of from 2 to 12. For example, the aqueous preparation obtained in step d) has a pH value of from 6 to 12 and more preferably from 7 to 10.5.

Typically, the aqueous preparations obtained in step d) has a viscosity being preferably in the range between 50 to 2 000 mPa·s and preferably 80 to 800 mPa·s, as measured with a Brookfield DV-II Viscometer at a speed of 100 rpm and equipped with a LV-3 spindle.

Characterisation of Step e): Contacting the Aqueous Preparation with the at Least One Water Soluble Source of Lithium Ions According to step e) of the process of the present invention, the aqueous preparation of step a) is contacted before and/or during and/or after step d) with the at least one water soluble source of lithium ions of step c).

The aqueous preparation of step a) and the at least one water soluble source of lithium ions of step c) can be brought into contact by any conventional means known to the skilled person.

It is appreciated that contacting step e) is preferably carried out by adding the at least one water soluble source of lithium ions of step c) to the aqueous preparation of step a) before and/or during and/or after adding the at least one biocide of step b) to the aqueous preparation of step a).

For example, at least one water soluble source of lithium ions is preferably added into the aqueous preparation by mixing. A sufficient mixing may be achieved by shaking or by agitation, which may provide a more thorough mixing. In one embodiment of the present invention, contacting step e) is carried out under agitation to ensure a thorough mixing of the aqueous preparation and the at least one water soluble source of lithium ions. Such agitation can be carried out continuously or discontinuously.

In one embodiment of the present invention, the step of contacting the aqueous preparation of step a) with the at least one water soluble source of lithium ions of step c) is carried out in that the at least one water soluble source of lithium ions is added to the aqueous preparation before and during and after adding the at least one biocide to the aqueous preparation.

Alternatively, contacting step e) is carried out by adding the at least one water soluble source of lithium ions of step c) to the aqueous preparation before and after adding the at least one biocide to the aqueous preparation. Alternatively, contacting step e) is carried out by adding the at least one water soluble source of lithium ions of step c) to the aqueous preparation before and during adding the at least one biocide to the aqueous preparation. Alternatively, contacting step e) is carried out by adding the at least one at least one water soluble source of lithium ions of step c) to the aqueous preparation during and after adding the at least one biocide to the aqueous preparation.

In case the at least one water soluble source of lithium ions of step c) is added to the aqueous preparation before and during and after or before and during or during and after or before and after adding the at least one biocide to the aqueous preparation, the at least one water soluble source of lithium ions of step c) is preferably added in several portions and/or continuously over the period required for contacting the aqueous preparation with the at least one water soluble source of lithium ions of step c).

If the at least one water soluble source of lithium ions of step c) is added in several portions, the at least one water soluble source of lithium ions of step c) can be added in about equal portions or unequal portions to the aqueous preparation.

In one embodiment of the present invention, contacting step e) is carried out in that the at least one water soluble source of lithium ions of step c) is added to the aqueous preparation of step a) before or during or after adding the at least one biocide to the aqueous preparation.

For example, contacting step e) is carried out by adding the at least one water soluble source of lithium ions of step c) to the aqueous preparation before or during adding the at least biocide to the aqueous preparation. Alternatively, contacting step e) is carried out by adding the at least one water soluble source of lithium ions of step c) to the aqueous preparation before or after adding the at least one biocide to the aqueous preparation. Alternatively, contacting step e) is carried out by adding the at least one water soluble source of lithium ions of step c) to the aqueous preparation during or after adding the at least one biocide to the aqueous preparation.

In one embodiment of the present invention, contacting step e) is carried out by adding the at least one water soluble source of lithium ions of step c) to the aqueous preparation before adding the at least one biocide to the aqueous preparation. Alternatively, contacting step e) is carried out by adding the at least one water soluble source of lithium ions of step c) to the aqueous preparation during adding the at least one biocide to the aqueous preparation. Alternatively, contacting step e) is carried out by adding the at least one water soluble source of lithium ions of step c) to the aqueous preparation after adding the at least one biocide to the aqueous preparation.

For example, contacting step e) is carried out by adding the at least one water soluble source of lithium ions of step c) to the aqueous preparation before adding the at least one biocide to the aqueous preparation. Thus, it is preferred that contacting step e) is carried out before contacting step d).

Alternatively, the at least one water soluble source of lithium ions of step c) is added to the aqueous preparation in combination with the at least one biocide of step b) as finished mixture. Accordingly, the at least one water soluble source of lithium ions of step c) is preferably added to the aqueous preparation during contacting step d) is carried out.

In this embodiment, contacting step e) of the instant process is preferably carried out by adding a finished mixture comprising the at least one water soluble source of lithium ions of step c) and the at least one biocide of step b) to the aqueous preparation of step a).

If the at least one biocide of step b) and the at least one water soluble source of lithium ions of step c) are provided in form a mixture, the mixture can be present in any appropriate form, e.g. in the form of a dry material or in the form of an aqueous solution.

If the at least one water soluble source of lithium ions of step c) is added to the aqueous preparation before or during or after adding the at least one biocide to the aqueous preparation, the at least one water soluble source of lithium ions is preferably added in one portion and/or continuously before or during or after adding the at least one biocide to the aqueous preparation.

Accordingly, the at least one biocide and the at least one water soluble source of lithium ions can be added separately (first the at least one biocide and then the at least one water soluble source of lithium ions or vice versa) or simultaneously (e.g. as an aqueous mixture) to the aqueous preparation. Furthermore, the at least one biocide and/or the at least one water soluble source of lithium ions can be added once or several times, e.g. in specific time intervals, to the aqueous preparation. Preferably, the at least one water soluble source of lithium ions is added once and the at least one biocide is added once or several times, e.g. in specific time intervals, to the aqueous preparation.

It is appreciated that contacting step e) can be repeated one or more times.

It is one requirement of the present invention that the at least one water soluble source of lithium ions of step c) is present in the water phase of the aqueous preparation such that the total amount of lithium ions is from 15.0 to 800.0 mMol/L, calculated relative to the weight of water in the aqueous preparation. For example, the at least one water soluble source of lithium ions of step c) is present in the water phase of the aqueous preparation such that the total amount of lithium ions is from 15.0 to 700.0 mMol/L, calculated relative to the weight of water in the aqueous preparation. In one embodiment of the present invention, the at least one water soluble source of lithium ions of step c) is present in the water phase of the aqueous preparation such that the total amount of lithium ions is from 15.0 to 600.0 mMol/L, calculated relative to the weight of water in the aqueous preparation.

It is to be noted that the aforementioned figures reflect the amount of lithium ions being added via the at least one water soluble source of lithium ions to an aqueous preparation as MIC reducing compound and do not cover any dissolved lithium ions which may naturally be present in the aqueous preparation. However, the amount of dissolved naturally occurring lithium ions in e.g. calcium carbonate slurry usually is neglectable and well below 50.0 ppm, based on the pigment content of the slurry.

The amount of the at least one water soluble source of lithium ions added to the aqueous preparation can be individually adjusted depending on the at least one biocide to be added into the aqueous preparation. In particular, the amount of the at least one water soluble source of lithium ions depends on the nature and the occurrence of the at least one biocide to be used in the aqueous preparation. The optimum amount to be employed within the defined ranges can be determined by preliminary tests and test series on a laboratory scale and by supplementary operational tests.

In accordance with the present invention, the lithium ions of the at least one water soluble source of lithium ions act as MIC reducing compound and thus the instant process is suitable for reducing the minimum inhibitory concentration (MIC) of a biocide against at least one strain of bacteria and/or at least one strain of yeast and/or at least one strain of mould in the aqueous preparation.

In particular, the aqueous preparation is contacted with the at least one water soluble source of lithium ions in an amount such that the minimum inhibitory concentration (MIC) of the at least one biocide against the at least one strain of bacteria and/or at least one strain of yeast and/or at least one strain of mould fulfils the equation (I)

$$MIC_{withoutLi}/MIC_{Li} \geq 1.1 \quad (I)$$

wherein
$MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm, calculated relative to the weight of water in the aqueous preparation of step a),
$MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm, calculated relative to the weight of water in the aqueous preparation of step a).

In one embodiment of the present invention, contacting step e) is carried out such that the minimum inhibitory concentration (MIC) of the at least one biocide against the at least one strain of bacteria and/or at least one strain of yeast and/or at least one strain of mould fulfils the equation (Ia), preferably equation (Ib) and most preferably equation (Ic)

$$MIC_{withoutLi}/MIC_{Li} \geq 1.5 \quad (Ia)$$

$$MIC_{withoutLi}/MIC_{Li} \geq 2.0 \quad (Ib)$$

$$MIC_{withoutLi}/MIC_{Li} \geq 4.0 \quad (Ic)$$

wherein
$MIC_{withoutLi}$ is the minimum inhibitory concentration (MIC) of the biocide against the at least one strain of bacteria and/or at least one strain of yeast and/or at least one strain of mould without the at least one water soluble source of lithium ions in ppm calculated relative to the weight of water in the aqueous preparation of step a),
$MIC_{Li}$ is the minimum inhibitory concentration (MIC) of the biocide against the at least one strain of bacteria and/or at least one strain of yeast and/or at least one strain of mould with the at least one water soluble source of lithium ions in ppm calculated relative to the weight of water in the aqueous preparation of step a).

For example, contacting step e) is carried out such that the minimum inhibitory concentration (MIC) of the at least one biocide against the at least one strain of bacteria and/or at least one strain of yeast and/or at least one strain of mould fulfils the equation (II), preferably the equation (IIa), more preferably equation (IIb) and most preferably equation (IIc)

$$1.1 \leq MIC_{withoutLi}/MIC_{Li} \leq 30.0 \quad (II)$$

$$1.1 \leq MIC_{withoutLi}/MIC_{Li} \leq 25.0 \quad (IIa)$$

$$1.1 \leq MIC_{withoutLi}/MIC_{Li} \leq 20.0 \quad (IIb)$$

$$1.1 \leq MIC_{withoutLi}/MIC_{Li} \leq 10.0 \quad (IIc)$$

wherein
$MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a),
$MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

In one embodiment of the present invention, contacting step e) is carried out such that the minimum inhibitory concentration (MIC) of the at least one biocide against the at least one strain of bacteria and/or at least one strain of yeast and/or at least one strain of mould fulfils the equation (III), preferably the equation (IIIa), more preferably equation (IIIb) and most preferably equation (IIIc)

$$1.1 \leq MIC_{withoutLi}/MIC_{Li} \leq 30.0 \quad (III)$$

$$1.5 \leq MIC_{withoutLi}/MIC_{Li} \leq 25.0 \quad (IIIa)$$

$$2.0 \leq MIC_{withoutLi}/MIC_{Li} \leq 20.0 \quad (IIIb)$$

$$4.0 \leq MIC_{withoutLi}/MIC_{Li} \leq 10.0 \quad (IIIc)$$

wherein
$MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a),
$MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

It is to be understood that the amount of the at least one water soluble source of lithium ions according to the present invention is selected such that it is in combination with the at least one biocide in the aqueous preparation sufficient, i.e. high enough for reducing the minimum inhibitory concentration (MIC) of a biocide against at least one strain of bacteria and/or at least one strain of yeast and/or at least one strain of mould in an aqueous preparation. In other words, by using the inventive process the minimum inhibitory concentration (MIC) of a biocide is reduced such that the amount of the at least one biocide in the aqueous preparation can be significantly reduced in order to provide efficient biocidal activity.

It is thus appreciated that the aqueous preparation of the present invention comprises lithium ions. The aqueous preparation is preferably obtainable by the process of the instant invention, i.e. the process for reducing the minimum inhibitory concentration (MIC) of a biocide against at least one strain of bacteria and/or at least one strain of yeast and/or at least one strain of mould in an aqueous preparation.

The lithium ions of the at least one water soluble source of lithium ions are considered as MIC reducing compound. It is thus required that the aqueous preparation comprises the lithium ions such that the total amount of lithium ions in the water phase is from 15.0 to 800.0 mMol/L, more preferably from 15.0 to 700.0 mMol/L and most preferably from 15.0 to 600.0 mMol/L, calculated relative to the weight of water in the aqueous preparation.

Additionally, the aqueous preparation comprises at least one biocide being effective against at least one strain of bacteria and/or at least one strain of yeast and/or at least one strain of mould. Preferably, the aqueous preparation comprises the at least one biocide such that its total amount in the water phase is from 0.4 to 6 500.0 ppm, preferably from 0.5 ppm to 6 000.0 ppm, calculated relative to the weight of water in the aqueous preparation.

With regard to the definition of the at least one biocide, the at least one strain of bacteria and/or at least one strain of yeast and/or at least one strain of mould and preferred embodiments thereof, reference is made to the statements provided above when discussing the technical details of the process of the present invention.

In one embodiment of the present invention, the aqueous preparation of the instant process is free of aldehyde-releasing and/or aldehyde-based biocides in an amount of 250.0 to 5 000.0 ppm, calculated relative to the weight of water in the preparation, when strains of bacteria which are resistant to, tolerant to and/or degrade aldehyde-releasing and/or aldehyde-based biocides are present in the aqueous preparation. Preferably, the aqueous preparation of the instant process is free of aldehyde-releasing and/or aldehyde-based biocides in an amount sufficient to be effective against strains of bacteria which are resistant to, tolerant to and/or degrade aldehyde-releasing and/or aldehyde-based biocides in the aqueous preparation, when such strains of bacteria are present in the aqueous preparation.

As already mentioned above, the lithium ions of the at least one water soluble source of lithium ions effect a reduction of the minimum inhibitory concentration of the at least one biocide being effective against at least one strain of bacteria and/or at least one strain of yeast and/or at least one strain of mould in the aqueous preparation.

Thus, the aqueous preparation comprises the at least one biocide in an amount being below the minimum inhibitory concentration (MIC) of the same biocide in the absence of lithium ions.

It is thus appreciated that the instant the aqueous preparation comprises the at least one biocide in an amount being at least 9%, preferably at least 33%, more preferably at least 50% and most preferably at least 75%, below the minimum inhibitory concentration (MIC) of the at least one biocide being effective against the at least one strain of bacteria and/or at least one strain of yeast and/or at least one strain of mould in the absence of the MIC reducing compound, i.e. the at least one water soluble source of lithium ions.

Accordingly, it is one specific finding of the instant aqueous preparation that it comprises the at least one biocide in an amount such that the minimum inhibitory concentration (MIC) of the at least one biocide against the at least one strain of bacteria and/or at least one strain of yeast and/or at least one strain of mould fulfils the equation (I)

$$MIC_{withoutLi}/MIC_{Li} \geq 1.1 \tag{1}$$

wherein
$MIC_{withoutLi}$ is the minimum inhibitory concentration (MIC) of the at least one biocide against the at least one strain of bacteria and/or at least one strain of yeast and/or at least one strain of mould without the water soluble lithium ions in ppm, calculated relative to the weight of water in the aqueous preparation,
$MIC_{Li}$ is the minimum inhibitory concentration (MIC) of the at least one biocide against the at least one strain of bacteria and/or at least one strain of yeast and/or at least one strain of mould with the water soluble lithium ions in ppm, calculated relative to the weight of water in the aqueous preparation.

Preferably, the aqueous preparation comprises the at least one biocide in an amount such that the minimum inhibitory concentration (MIC) of the at least one biocide against the at least one strain of bacteria and/or at least one strain of yeast and/or at least one strain of mould fulfils the equation (Ia), preferably equation (Ib) and most preferably equation (Ic)

$$MIC_{withoutLi}/MIC_{Li} \geq 1.5 \tag{Ia}$$

$$MIC_{withoutLi}/MIC_{Li} \geq 2.0 \tag{Ib}$$

$$MIC_{withoutLi}/MIC_{Li} \geq 4.0 \tag{Ic}$$

wherein
$MIC_{without}$ is the minimum inhibitory concentration (MIC) of the at least one biocide against the at least one strain of bacteria and/or at least one strain of yeast and/or at least one strain of mould without the water soluble lithium ions in ppm, calculated relative to the weight of water in the aqueous preparation,
$MIC_{Li}$ is the minimum inhibitory concentration (MIC) of the at least one biocide against the at least one strain of bacteria and/or at least one strain of yeast and/or at least one strain of mould with the water soluble lithium ions in ppm, calculated relative to the weight of water in the aqueous preparation.

For example, the aqueous preparation comprises the at least one biocide in an amount such that the minimum inhibitory concentration (MIC) of the at least one biocide against the at least one strain of bacteria and/or at least one strain of yeast and/or at least one strain of mould fulfils the equation (II), preferably the equation (IIa), more preferably equation (IIb) and most preferably equation (IIc)

$$1.1 \leq MIC_{withoutLi}/MIC_{Li} \leq 30.0 \tag{II}$$

$$1.1 \leq MIC_{withoutLi}/MIC_{Li} \leq 25.0 \tag{IIa}$$

$$1.1 \leq MIC_{withoutLi}/MIC_{Li} \leq 20.0 \tag{IIb}$$

$$1.1 \leq MIC_{withoutLi}/MIC_{Li} \leq 10.0 \tag{IIc}$$

wherein
$MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a),
$MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

In one embodiment of the present invention, the aqueous preparation comprises the at least one biocide in an amount such that the minimum inhibitory concentration (MIC) of the at least one biocide against the at least one strain of bacteria and/or at least one strain of yeast and/or at least one strain of mould fulfils the equation (III), preferably the equation (IIIa), more preferably equation (IIIb) and most preferably equation (IIIc)

$$1.1 \leq MIC_{withoutLi}/MIC_{Li} \leq 30.0 \quad \text{(III)}$$

$$1.5 \leq MIC_{withoutLi}/MIC_{Li} \leq 25.0 \quad \text{(IIIa)}$$

$$2.0 \leq MIC_{withoutLi}/MIC_{Li} \leq 20.0 \quad \text{(IIIb)}$$

$$4.0 \leq MIC_{withoutLi}/MIC_{Li} \leq 10.0 \quad \text{(IIIc)}$$

wherein
$MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a),
$MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

The liquid phase of the aqueous preparation comprises, preferably consists of, water. In one embodiment of the present invention, the aqueous preparation comprises an organic solvent selected from the group comprising alcohols such as methanol, ethanol, isopropanol, carbonyl-group containing solvents such as ketones, e.g. acetone or aldehydes, esters such as isopropyl acetate, carboxylic acids such as formic acid, sulfoxidess such as dimethyl sulfoxide and mixtures thereof. If the aqueous preparation comprises an organic solvent, the aqueous preparation comprises the organic solvent in an amount up to 40.0 wt.-% preferably from 1.0 to 30.0 wt.-% and most preferably from 1.0 to 25.0 wt.-%, based on the total weight of the liquid phase of the aqueous preparation. For example, the liquid phase of the aqueous preparation consists of water. If the liquid phase of the aqueous preparation consists of water, the water can be any water such as tap water and/or deionised water.

The aqueous preparation preferably comprises at least one inorganic particulate material and/or at least one organic material.

With regard to the definition of the at least one inorganic particulate material, at least one organic material and preferred embodiments thereof, reference is made to the statements provided above when discussing the technical details of the process of the present invention.

Thus, the aqueous preparation is preferably an aqueous slurry.

The aqueous preparation preferably has solids content of up to 85.0 wt.-%. For example, the solids content of the aqueous preparation is from 10.0 to 82.0 wt.-%, and more preferably from 20.0 to 80.0 wt.-%, based on the total weight of the aqueous preparation.

The aqueous preparation preferably has a pH value of from 2 to 12. For example, the aqueous preparation has a pH value of from 6 to 12 and more preferably from 7 to 10.5.

Typically, the aqueous preparation has a viscosity being preferably in the range between 50 to 800 mPa·s and preferably 80 to 600 mPa·s, as measured with a Brookfield DV-II Viscometer at a speed of 100 rpm and equipped with a LV-3 spindle.

The inventive process or aqueous preparation thus provides a number of improved properties. First of all, the addition of a specific amount of lithium ions in form of a at least one water soluble source of lithium ions reduces the minimum inhibitory concentration (MIC) of the at least one biocide being effective against at least one strain of bacteria and/or at least one strain of yeast and/or at least one strain of mould when present in an aqueous preparation in comparison to the minimum inhibitory concentration (MIC) of the same biocide in the absence of the lithium ions. The lithium ions of the at least one water soluble source of lithium ions thus act as MIC reducing compound. The inventive process thus allows for the reduction of the biocide concentration in an aqueous preparation maintaining and/or improving the biocidal activity.

The addition of lithium ions in the inventive process or compositions results in a reduced or prevented growth and accumulation of at least one strain of bacteria and/or at least one strain of yeast and/or at least one strain of mould in the aqueous preparation and the tendency of alterations of these preparations is reduced, while low viscosity, the brilliance of the colour and the odour quality of the preparations can be maintained. Furthermore, the stabilisation of such preparations against attack and destruction by at least one strain of bacteria and/or at least one strain of yeast and/or at least one strain of mould in an aqueous preparation, results in a good microbiological quality of the preparations.

In accordance with the present invention, the at least one water soluble source of lithium ions is used as MIC reducing compound. The MIC reducing compound referred to herein is a compound which is capable of reducing the minimum inhibitory concentration (MIC) of a biocide against at least one strain of bacteria and/or at least one strain of yeast and/or at least one strain of mould in an aqueous preparation relative to an aqueous preparation having no such MIC reducing compound. In other words, the lithium ions of the at least one water soluble source of lithium ions, used according to the present invention in combination with the at least one biocide, reduce the minimum inhibitory concentration (MIC) of the biocide in the aqueous preparation.

In view of the goods results obtained, the present invention refers in a further aspect to the use of a water soluble source of lithium ions for reducing the minimum inhibitory concentration (MIC) of a biocide against at least one strain of bacteria and/or at least one strain of yeast and/or at least one strain of mould in an aqueous preparation. It is appreciated that the reduction is achieved when the minimum inhibitory concentration (MIC) of the at least one biocide against the at least one strain of bacteria and/or at least one strain of yeast and/or at least one strain of mould fulfils the equation (I), preferably the equation (Ia), more preferably equation (Ib) and most preferably equation (Ic)

$$MIC_{withoutLi}/MIC_{Li} \geq 1.1 \quad \text{(I)}$$

$$MIC_{withoutLi}/MIC_{Li} \geq 1.5 \quad \text{(Ia)}$$

$$MIC_{withoutLi}/MIC_{Li} \geq 2.0 \quad \text{(Ib)}$$

$$MIC_{withoutLi}/MIC_{Li} \geq 4.0 \quad \text{(Ic)}$$

wherein
$MIC_{witoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a), $MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

Preferably, the reduction is achieved when the minimum inhibitory concentration (MIC) of the at least one biocide against the at least one strain of bacteria and/or at least one strain of yeast and/or at least one strain of mould fulfils the equation (II), preferably the equation (IIa), more preferably equation (IIb) and most preferably equation (IIc)

$$1.1 \leq MIC_{withoutLi}/MIC_{Li} \leq 30.0 \tag{II}$$

$$1.1 \leq MIC_{withoutLi}/MIC_{Li} \leq 25.0 \tag{IIa}$$

$$1.1 \leq MIC_{withoutLi}/MIC_{Li} \leq 20.0 \tag{IIb}$$

$$1.1 \leq MIC_{withoutLi}/MIC_{Li} \leq 10.0 \tag{IIc}$$

wherein $MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a), $MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

More preferably, the reduction is achieved when the minimum inhibitory concentration (MIC) of the at least one biocide against the at least one strain of bacteria and/or at least one strain of yeast and/or at least one strain of mould fulfils the equation (III), preferably the equation (IIIa), more preferably equation (IIIb) and most preferably equation (IIIc)

$$1.1 \leq MIC_{withoutLi}/MIC_{Li} \leq 30.0 \tag{III}$$

$$1.5 \leq MIC_{withoutLi}/MIC_{Li} \leq 25.0 \tag{IIIa}$$

$$2.0 \leq MIC_{withoutLi}/MIC_{Li} \leq 20.0 \tag{IIIb}$$

$$4.0 \leq MIC_{withoutLi}/MIC_{Li} \leq 10.0 \tag{IIIc}$$

wherein $MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm calculated relative to the weight of water in the aqueous preparation of step a), $MIC_{Li}$ is the minimum inhibitory concentration (MIC) of the at least one biocide against the at least one strain of bacteria and/or at least one strain of yeast and/or at least one strain of mould with the at least one water soluble source of lithium ions in ppm calculated relative to the weight of water in the aqueous preparation of step a).

With regard to the definition of the at least one water soluble source of lithium ions, aqueous preparation, at least one biocide, at least one strain of bacteria and/or at least one strain of yeast and/or at least one strain of mould and preferred embodiments thereof, reference is made to the statements provided above when discussing the technical details of the process of the present invention.

The following examples may additionally illustrate the invention, but are not meant to restrict the invention to the exemplified embodiments. The examples below show the good microbiological stability of the aqueous preparations of minerals, pigments or fillers protected with the composition according to the present invention:

EXAMPLES

Measurement Processes

The following measurement processes were used to evaluate the parameters given in the examples and claims.

BET Specific Surface Area of a Material

The BET specific surface area was measured via the BET process according to ISO 9277 using nitrogen.

Particle Size Distribution (Mass % Particles with a Diameter <X) and Weight Median Diameter ($D_{50}$) of a Particulate Material Weight median grain diameter and grain diameter mass distribution of a particulate material were determined via the sedimentation process, i.e. an analysis of sedimentation behaviour in a gravitational field. The measurement was made with a Sedigraph™ 5100 of Micromeritics Instrument Corporation.

The method and the instrument are known to the skilled person and are commonly used to determine grain size of fillers and pigments. The measurement is carried out in an aqueous solution of 0.1 wt % $Na_4P_2O_7$. The samples are dispersed using a high speed stirrer and supersonics.

pH Measurement

The pH of the water samples is measured by using a standard pH-meter at approximately 25° C.

Brookfield-Viscosity

All Brookfield-viscosities are measured with a Brookfield DV-II Viscometer equipped with a LV-3 spindle at a speed of 100 rpm and room temperature (20±3° C.).

Amounts of Biocide and Lithium

All biocide and lithium amounts quoted in ppm represent mg values per kilogram of water in the aqueous preparation. Lithium ion concentrations are further quoted in mMol/L (millimol per litre) or mM (millimolar) according to the International System of Units in the water of the aqueous preparation.

Bacterial Count

When not otherwise indicated, the quoted bacterial counts (values are in cfu/plate) in the Tables here below are determined after 2 days following plate-out and incubation at 30° C. The counting method was as follows. The aqueous preparations were stirred well with a cotton swap (e.g. Applmed SA, No. 1102245); the excess aqueous preparation was removed by dipping it gently to the side of the aqueous preparation container, leaving approximately 200 mg of aqueous preparation on the swap. Then three even streaks were made on a tryptic soy agar plate (TSA, prepared using BD 236950) from right to left and three more from top to bottom. TSA plates were then incubated for 48 h at 30° C. Colony forming units (cfu) were then counted and reported as cfu/plate. Counts from 100 to 999 cfu per plate are reported as ≥100 cfu/plate. Counts of 1000 cfu and above per plate are reported as ≥1000 cfu/plate. Yeast and moulds were counted as described for bacteria with the following exceptions, a) Sabouraud Dextrose Agar (SDA) containing Chloramphenicol (e.g. heipha Dr. Müller GmbH, No. 1460030020) were used instead of TSA, b) SDA plates were incubated at 25° for 5 days and c) cfu were counted and reported after 48 h and 5 days of incubation. Yeast and moulds counts from 20 to 99 cfu per plate are reported as ≥20 cfu/plate. Yeast and moulds counts of 100 cfu and above per plate are reported as ≥100 cfu/plate.

Solids Content

The solids content is measured using a Moisture Analyzer of Mettler-Toledo MJ33. The method and the instrument are known to the skilled person.

Minimum Inhibitory Concentration (MIC)

For determining the MIC, the tested microorganism, i.e. the strain of bacteria and/or strain of yeast and/or strain of mould, were freshly grown until the end of the logarithmic growth phase according to the requirements of the individual species to a density of approximately $10^7$-$10^9$ cells/ml.

For example, fresh bacteria cultures of the bacteria *E. coli*, e.g. *E. coli* ATCC 11229, and *S. aureus*, e.g. *S. aureus* strains DSMZ 346, were prepared by inoculation of 3 ml liquid growth media (tryptic soy broth, e.g. Fluka Cat. No. 22092) from a stock culture and incubation for 16 to 20 h at 30° C. with agitation at 150 rotations per minutes (rpm) leading to a cell density of approximately $2\times10^8$ cells/ml. Fresh cultures of resistant bacteria, adapted to the conditions in biocide containing $CaCO_3$ slurries, were prepared by inoculation of 50 g 75 wt.-% solid content $CaCO_3$ slurry from a stock culture and incubated for 14 to 28 days at 30° C. without agitation. The slurry contained the corresponding biocides to which the strains are resistant at the concentrations described herebelow. rOmyAK, is a *Pseudomonas mendocina* strain resistant to a biocide mixture of 750 ppm 1,6-Dihydroxy-2,5-dioxane (CAS NO. 3586-55-8) and 19 ppm CMIT/MIT (CAS NO. 55965-84-9). rOPP, is a *Pseudomonas mendocina* strain resistant to 660 ppm 2-phenylphenol (OPP) (CAS NO 90-43-7). rGDA/IT, is a *Pseudomonas mendocina* strain resistant to a biocide mixture of 340 ppm glutaraldehyde (CAS NO. 111-30-8) and 20 ppm CMIT/MIT (CAS NO. 55965-84-9).

Lithium ions were added to the aqueous preparation (e.g. $CaCO_3$ slurry) by the addition of a water soluble lithium salt. For example to 50 g $CaCO_3$ slurry with a solid content of 75% (w/w) 1.177 ml of a 74 g/l $Li_2CO_3$ suspension was added and mixed well leading to a lithium ion concentration of 172 mM or 1205 ppm in the water phase. As another example to 50 g $CaCO_3$ slurry with a solid content of 75 wt.-% (w/w) 0.04 ml of a 292 g/L $Li_3$Citrate (2M) solution was added and mixed well leading to a lithium ion concentration of 19 mM or 135 ppm in the water phase.

The biocide to be tested was added to the aqueous preparation (e.g. $CaCO_3$ slurry with or without lithium ions) in increasing concentrations starting from 0 ppm (without biocide). The concentrations ranged from concentrations higher than recommended by the supplier, to very low amounts (as low as 1 ppm or lower). Of each biocide concentration a 3 ml sample of aqueous preparation was combined with 20 µl fresh bacterial culture.

If a curative MIC was tested, the bacteria were added to the aqueous preparation before the biocide and the lithium was added, using 20 µl of a fresh bacterial culture per 3 ml of aqueous preparation or 0.1 ml of a fresh culture of resistant bacteria from a slurry per 3 ml of aqueous preparation.

All samples were incubated at 30° C. for 24 h. After incubation colony forming units (cfu) per plate (cfu/plate) were determined as described above under bacterial count.

The MIC for bacteria is defined as the lowest concentration of biocide in the presence or absence of lithium ion amongst all samples tested, where the bacterial concentration dropped below 100 cfu/plate. The MIC for yeast and mould is defined as the lowest concentration of biocide in the presence or absence of lithium ion amongst all samples tested, where the microbial concentration dropped below 20 cfu/plate. The test was valid only, if the sample without biocide showed more than 100 cfu/plate for bacteria and more than 20 cfu/plate for yeast and mould. If none of the samples containing the respective biocide dropped below 100 cfu/plate for bacteria and below 20 cfu/plate for yeast and mould the MIC was reported as >highest biocide concentration tested (e.g. >1000 ppm).

Example 1

Preparation of Calcium Carbonate Slurries

An aqueous slurry of calcium carbonate (Italian marble; $d_{50}$=10 µm; 21 wt.-%<2 µm) was prepared at 75 wt.-% solid content. The slurry was wet ground at 95° C. using 0.6 wt.-% in respect to dry solids material of a sodium/calcium neutralized polyacrylate grinding agent (Mw 6 000) in a 200 l vertical ball mill to a final particle size distribution of $d_{50}$=0.7 µm; 90 wt.-%<2 µm.

Example 2

MIC Determination and Reduction

The determination of the minimum inhibitory concentration (MIC) for various biocides in the absence of lithium ions and the corresponding MIC reduction of the respective biocide in the presence of lithium ions against strains of various bacterial species are summarized in Tables 1 to 4 here below. The tests were carried out with differing biocide concentrations at constant lithium ion concentration. Numbers indicate cfu/plate.

TABLE 1

Testing the MIC of MIT (CAS NO 2682-20-4) in the presence and absence of lithium ions against the bacterial strain rOmy AK

| rOmy AK | no MIT | 18 ppm MIT | 35 ppm MIT | 106 ppm MIT |
| --- | --- | --- | --- | --- |
| 329 mM Li$^+$ | ≥1000 | ≥100 | 68 | 0 |
| no Li$^+$ | ≥1000 | ≥1000 | ≥100 | 0 |

The MIC for bacteria was defined as the lowest concentration of biocide in the presence or absence of lithium ions amongst all samples tested, where the bacterial concentration dropped below 100 cfu/plate. As can be gathered from Table 1, the minimum inhibitory concentration (MIC) of MIT against the rOmy AK strain is clearly above 35 ppm MIT when the biocide is implemented alone at the listed amount, i.e. in the absence of lithium ions, the MIC$_{withoutLi}$ is 106 ppm. The results also show that when lithium ions are provided alone via the addition of $Li_2CO_3$, they have no antimicrobial effect on the rOmy AK strain. However, if the biocide is implemented in combination with lithium ions, the MIC$_{Li}$ of MIT against the rOmy AK strain is reduced to 35 ppm MIT.

TABLE 2

Testing the MIC of 4-chloro-3-methylphenol (CAS NO 59-50-7) in the presence and absence of lithium ions against the bacterial E. coli strain ATCC11229

| E. coli ATCC11229 | no 4-chloro-3-phenol | 88.5 ppm 4-chloro-3-methyl-methylphenol | 177 ppm 4-chloro-3-methyl-phenol | 354 ppm 4-chloro-3-methyl-phenol |
|---|---|---|---|---|
| 197 mM/Li$^+$ | ≥100 | ≥100 | 23 | 0 |
| no Li$^+$ | ≥1000 | ≥1000 | ≥100 | 0 |

As can be gathered from Table 2, the minimum inhibitory concentration (MIC) of 4-chloro-3-methylphenol against the E. coli strain is clearly above 177 ppm 4-chloro-3-methylphenol when the biocide is implemented alone at the listed amount, i.e. in the absence of lithium ions, the MIC$_{withoutLi}$ is 354 ppm. The results also show that when lithium ions are provided alone via the addition of Li$_2$CO$_3$, they have no antimicrobial effect on the E. coli strain. However, if the biocide is implemented in combination with lithium ions, the MIC$_{Li}$ of 4-chloro-3-methylphenol against the E. coli strain is reduced to 177 ppm 4-chloro-3-methylphenol.

TABLE 3

Testing the MIC of a CMIT/MIT (CAS NO. 55965-84-9) mixture (weight ratio: 3:1) in the presence and absence of lithium ions against the bacterial S. aureus strain DSMZ 346

| S. aureus DSMZ 346 | no CMIT/MIT | 7 ppm CMIT/MIT | 14 ppm CMIT/MIT | 28 ppm CMIT/MIT |
|---|---|---|---|---|
| 197 mM Li$^+$ | ≥1000 | 30 | 0 | 0 |
| no Li$^+$ | ≥1000 | ≥100 | ≥100 | 87 |

As can be gathered from Table 3, the minimum inhibitory concentration (MIC) of CMIT/MIT against the S. aureus strain is clearly above 14 ppm CMIT/MIT when the biocide is implemented alone at the listed amount, i.e. in the absence of lithium ions, the MIC$_{withoutLi}$ is 28 ppm. The results also show that when lithium ions are provided alone via the addition of Li$_2$CO$_3$, they have no antimicrobial effect on the S. aureus strain. However, if the biocide is implemented in combination with lithium ions, the MIC$_{Li}$ of CMIT/MIT against the S. aureus strain is reduced to 7 ppm CMIT/MIT.

TABLE 4

Testing the MIC of a Sodium pyrithione (CAS NO 3811-73-2) in the presence and absence of lithium ions against the bacterial S. aureus strain DSMZ 346

| S. aureus DSMZ 346 | no | 75 ppm | 150 ppm | 300 ppm | 600 ppm | 900 ppm |
|---|---|---|---|---|---|---|
| 96 mM | ≥1000 | ≥100 | 93 | 12 | 0 | 0 |
| no Li$^+$ | ≥1000 | ≥1000 | ≥100 | ≥100 | ≥100 | ≥100 |

As can be gathered from Table 4, the minimum inhibitory concentration (MIC) of sodium pyrithione against the S. aureus strain is clearly above 900 ppm sodium pyrithione when the biocide is implemented alone at the listed amount, i.e. in the absence of lithium ions, the MIC$_{withoutLi}$ is >900 ppm. The results also show that when lithium ions are provided alone via the addition of lithium citrate, they have no antimicrobial effect on the S. aureus strain. However, if the biocide is implemented in combination with these lithium ions, the MIC$_{Li}$ of sodium pyrithione against the S. aureus strain is reduced to 150 ppm sodium pyrithione.

Example 3

MIC Reduction for Various Biocides

The MIC reduction of the tested biocides in the presence of lithium ions against strains of various bacterial species are summarized in Table 5 here below. The tests were carried out with differing biocide concentrations, differing lithium ion concentrations and differing sources of lithium ions as described in the Table 5.

It is shown in Table 5 that the presence of lithium ions reduces the MIC of the tested biocides. In particular, the MIC reduction is expressed by a MIC ratio (MIC$_{without\ Li}$/MIC$_{Li}$) of ≥1.1.

TABLE 5

Analysis of the MIC reduction for various biocides

| Biocide/Active | Strain | Li$^+$ conc./aequeous mM | Li$^+$ conc./aequeous ppm | MIC active/aequeous mM | MIC active/aequeous ppm | MIC ratio* | Li$^+$ source/remark |
|---|---|---|---|---|---|---|---|
| 1,6-Dihydroxy-2,5-dioxane (CAS NO. 3586-55-8) | rOmyAK | no Li$^+$ | no Li$^+$ | >13.1 | >1593 | — | Li$_2$CO$_3$ |
| | | Li$^+$ 197 | Li$^+$ 1380 | 8.7 | 1062 | >1.5 | |
| | | Li$^+$ 423 | Li$^+$ 2964 | 5.8 | 708 | >2.25 | |
| Ampicilin (CAS NO 69-53-4) | E. coli | no Li$^+$ | no Li$^+$ | 0.016 | 5.7 | — | Li$_2$CO$_3$ |
| | | Li+ 423 | Li$^+$ 2964 | 0.001 | 0.4 | 16 | |
| Benzisothiazolinone (BIT) (CAS NO 2634-33-5) | S. aureus | no Li$^+$ | no Li$^+$ | >4.7 | >708 | — | Li$_2$CO$_3$ |
| | | Li$^+$ 423 | Li$^+$ 2964 | 2.3 | 354 | >2 | |
| | S. aureus | no Li$^+$ | no Li$^+$ | 7.94 | 1200 | — | Li$_2$CO$_3$/Curative treatment |
| | | Li+ 329 | Li+ 2305 | 3.97 | 600 | 2 | |
| Bronopol (CAS NO 52-51-7) | E. coli | no Li$^+$ | no Li$^+$ | 0.53 | 106.2 | — | Li$_2$CO$_3$ |
| | | Li+ 197 | Li+ 1380 | 0.18 | 35.4 | 3 | |
| | E. coli | no Li$^+$ | no Li$^+$ | >0.45 | >90 | — | Li$_2$CO$_3$ |
| | | Li+ 172 | Li$^+$ 1205 | 0.12 | 24 | >3.75 | |
| | S. aureus | no Li$^+$ | no Li$^+$ | 0.90 | 180 | — | Li$_2$CO$_3$ |
| | | Li$^+$ 197 | Li$^+$ 1380 | 0.45 | 90 | 2 | |
| | | Li$^+$ 329 | Li$^+$ 2305 | 0.15 | 30 | 6 | |
| | | Li$^+$ 423 | Li$^+$ 2964 | 0.05 | 9 | 20 | |
| | S. aureus | no Li$^+$ | no Li$^+$ | 0.90 | 180 | — | Li$_2$CO$_3$ |
| | | Li$^+$ 172 | Li$^+$ 1205 | 0.15 | 30 | 6 | |

TABLE 5-continued

Analysis of the MIC reduction for various biocides

| Biocide/Active | Strain | Li+ conc./aequeous mM | Li+ conc./aequeous ppm | MIC active/aequeous mM | MIC active/aequeous ppm | MIC ratio* | Li+ source/remark |
|---|---|---|---|---|---|---|---|
| 4-Chloro-3-methylphenol (CAS NO 59-50-7) | E. coli | no Li+ | no Li+ | 2.48 | 354 | — | $Li_2CO_3$ |
| | | Li+ 197 | Li+ 1380 | 1.24 | 177 | 2 | |
| | | Li+ 329 | Li+ 2305 | 0.62 | 88.5 | 4 | |
| | S. aureus | no Li+ | no Li+ | 3.72 | 531 | — | $Li_2CO_3$ |
| | | Li+ 423 | Li+ 2964 | 2.48 | 354 | 1.5 | |
| CMT/MIT (weight ratio 3:1) (CAS NO 55965-84-9) | S. aureus | no Li+ | no Li+ | 0.11 | 28.32 | — | $Li_2CO_3$ |
| | | Li+ 197 | Li+ 1380 | 0.03 | 7.08 | 4 | |
| | | Li+ 329 | Li+ 2305 | <0.03 | <7.08 | >4 | |
| | S. aureus | no Li+ | no Li+ | >0.23 | >60 | — | $Li_2CO_3$/Curative treatment |
| | | Li+ 423 | Li+ 2964 | 0.11 | 30 | >2 | |
| 3.5-Dimethyltetrahydro-1,3,5-thiadiazine-2- (CAS NO 533-74-4) | E. coli | no Li+ | no Li+ | 1.09 | 177 | — | $Li_2CO_3$ |
| | | Li+ 329 | Li+ 2305 | 0.87 | 141.6 | 1.25 | |
| | S. aureus | no Li+ | no Li+ | >1.09 | >177.4 | — | $Li_2CO_3$ |
| | | Li+ 423 | Li+ 2964 | 0.44 | 70.8 | >2.5 | |
| Formaldehyde (CAS NO 50-00-0) | rOmyAK | no Li+ | no Li+ | >35.4 | >1062 | — | $Li_2CO_3$ |
| | | Li+ 197 | Li+ 1380 | 11.8 | 354 | >3 | |
| | E. coli | no Li+ | no Li+ | >1.18 | >35.4 | — | $Li_2CO_3$ |
| | | Li+ 197 | Li+ 1380 | 0.59 | 17.7 | >2 | |
| | S. aureus | no Li+ | no Li+ | >1.18 | >35.4 | — | $Li_2CO_3$ |
| | | Li+ 197 | Li+ 1380 | 0.118 | 3.54 | >10 | |
| Glutaraldehyde (CAS NO. 111-30-8) | S. aureus | no Li+ | no Li+ | >0.35 | >35.4 | — | $Li_2CO_3$ |
| | | Li+ 197 | Li+ 1380 | 0.04 | 3.54 | >10 | |
| Guanidinedodecyl monochloride (CAS NO 13590-97-1) | E. coli | no Li+ | no Li+ | >0.13 | >35.4 | — | $Li_2CO_3$ |
| | | Li+ 197 | Li+ 1380 | 0.05 | 14.16 | >2.4 | |
| Hexachlorodimethyl sulfone (CAS NO 3064-70-8) | E. coli | no Li+ | no Li+ | 0.12 | 35.4 | — | $Li_2CO_3$ |
| | | Li+ 197 | Li+ 1380 | 0.07 | 21.24 | 1.67 | |
| | S. aureus | no Li+ | no Li+ | 0.09 | 28.32 | — | $Li_2CO_3$ |
| | | Li+ 329 | Li+ 2305 | 0.07 | 21.24 | 1.33 | |
| Methylene bis(thiocyanate) (CAS NO 6317-18-6) | S. aureus | no Li+ | no Li+ | 2.18 | 283.2 | — | $Li_2CO_3$ |
| | | Li+ 329 | Li+ 2305 | 0.54 | 70.8 | 4.04 | |
| 2-Methyl-2H-isothiazolin-3-one (MIT) (CAS NO 2682-20-4) | rGDA-IT | no Li+ | no Li+ | 1.54 | 177 | — | $Li_2CO_3$ |
| | | Li+ 197 | Li+ 1380 | 0.92 | 106.2 | 1.67 | |
| | rOmyAK | no Li+ | no Li+ | 0.92 | 106.2 | — | $Li_2CO_3$ |
| | | Li+ 197 | Li+ 1380 | 0.92 | 106.2 | 1 | |
| | | Li+ 329 | Li+ 2305 | 0.31 | 35.4 | 3 | |
| | | Li+ 423 | Li+ 2964 | 0.15 | 17.7 | 6 | |
| | E. coli | no Li+ | no Li+ | >1.54 | >177 | — | $Li_2CO_3$ |
| | | Li+ 197 | Li+ 1380 | 0.61 | 70.8 | >2.5 | |
| | S. aureus | no Li+ | no Li+ | >1.54 | >177 | — | $Li_2CO_3$ |
| | | Li+ 329 | Li+ 2305 | <0.31 | <35.4 | >5 | |
| Sodium pyrithione (CAS NO 3811-73-2) | E. coli | no Li+ | no Li+ | 3.56 | 531 | — | $Li_2CO_3$ |
| | | Li+ 197 | Li+ 1380 | 1.19 | 177 | 3 | |
| | S. aureus | no Li+ | no Li+ | >4.75 | >7.8 | — | $Li_2CO_3$ |
| | | Li+ 423 | Li+ 2964 | 2.37 | 354 | >2 | |
| | S. aureus | no Li+ | no Li+ | >6.04 | >900 | — | Li3Citrate |
| | | Li+ 19 | Li+ 135 | 2.01 | 300 | >3 | |
| | | Li+ 96 | Li+ 670 | 1.01 | 150 | >6 | |
| 2-Phenylphenol (OPP) (CAS NO 90-43-7) | rOPP | no Li+ | no Li+ | >9.36 | >1539 | — | $Li_2CO_3$ |
| | | Li+ 197 | Li+ 1380 | 2.08 | 354 | >4.5 | |
| | | Li+ 329 | Li+ 2305 | 1.04 | 177 | >9 | |
| | rOPP | no Li+ | no Li+ | 0.53 | 90 | — | $Li_2CO_3$ |
| | | Li+ 172 | Li+ 1205 | 0.26 | 45 | 2 | |
| | E. coli | no Li+ | no Li+ | 3.12 | 531 | — | $Li_2CO_3$ |
| | | Li+ 197 | Li+ 1380 | 2.08 | 354 | 1.5 | |
| | S. aureus | no Li+ | no Li+ | 1.76 | 300 | — | $Li_2CO_3$ |
| | | Li+ 53 | Li+ 370 | 0.88 | 150 | 2 | |
| | S. aureus | no Li+ | no Li+ | 1.76 | 300 | — | LiOH |
| | | Li+ 67 | Li+ 470 | 0.18 | 30 | 10 | |
| Biocide mixture (25% (w/w) glutaraldehyde (CAS NO. 111-30-8) and 1.5% (w/w) CMIT/MIT (weight ratio CMIT/MIT 3:1) (CAS NO. 55965-84-9) | rGDA-IT | no Li+ | no Li+ | N/A | >1593 | — | $Li_2CO_3$ |
| | | Li+ 197 | Li+ 1380 | N/A | 1239 | >1.29 | |
| | | Li+ 329 | Li+ 2305 | N/A | <177 | >9 | |
| | E. coli | no Li+ | no Li+ | N/A | 177 | — | $Li_2CO_3$ |
| | | Li+ 197 | Li+ 1380 | N/A | 70.8 | 2.5 | |
| | | Li+ 329 | Li+ 2305 | N/A | 17.7 | 10 | |
| | S. aureus | no Li+ | no Li+ | N/A | 354 | — | $Li_2CO_3$ |
| | | Li+ 197 | Li+ 1380 | N/A | 35.4 | 10 | |
| Polyethoxyethoxyethylguanidinium hexachlorid (CAS NO 374572-91-5) | E. coli | no Li+ | no Li+ | >0.71 | >708 | — | $Li_2CO_3$ |
| | | Li+ 197 | Li+ 1380 | 0.53 | 531 | >1.33 | |
| | | Li+ 423 | Li+ 2964 | 0.09 | 88.5 | >8 | |

*$MIC_{without\ Li}/MIC_{Li}$

The invention claimed is:

1. A process for reducing the minimum inhibitory concentration (MIC) of a biocide against at least one strain of bacteria and/or at least one strain of yeast and/or at least one strain of mould in an aqueous preparation, the process comprising the steps of:
   a) providing an aqueous preparation,
   b) providing at least one biocide selected from the group consisting of phenols, halogenated phenols, halogen-containing compounds, halogen-releasing compounds, isothiazolinones, guanidines, sulfones, thiocyanates, pyrithiones, antibiotics, β-lactam antibiotics, quaternary ammonium salts, peroxides, perchlorates, amides, amines, heavy metals, biocidal enzymes, biocidal polypeptides, azoles, carbamates, glyphosates, sulphonamides, and any mixture thereof,
   c) providing at least one water soluble source of lithium ions,
   d) contacting the aqueous preparation of step a) with the at least one biocide of step b), wherein the at least one biocide is effective against at least one strain of bacteria and/or at least one strain of yeast and/or at least one strain of mould when present in the aqueous preparation,
   e) contacting the aqueous preparation of step a) before and/or during and/or after step d) with the at least one water soluble source of lithium ions of step c),
   wherein the amount of the lithium ions and the amount of the at least one biocide are selected so that the minimum inhibitory concentration (MIC) of the biocide meets meet equation (I):

$$MIC_{withoutLi}/MIC_{Li} > 1.1 \qquad (I)$$

wherein
   $MIC_{withoutLi}$ is the minimum inhibitory concentration (MIC) of the at least one biocide against the at least one strain of bacteria and/or at least one strain of yeast and/or at least one strain of mould without the at least one water soluble source of lithium ions in ppm, calculated relative to the weight of water in the aqueous preparation of step a),
   $MIC_{Li}$, is the minimum inhibitory concentration (MIC) of the at least one biocide against the at least one strain of bacteria and/or at least one strain of yeast and/or at least one strain of mould with the at least one water soluble source of lithium ions in ppm, calculated relative to the weight of water in the aqueous preparation of step a),
   wherein the total amount of lithium ions is selected from 15.0 to 800.0 mMol/L, calculated relative to the weight of water in the aqueous preparation, and
   wherein the amount of the at least one biocide is selected from 0.4 to 6500.0 ppm, calculated relative to the weight of water in the aqueous preparation; and
   wherein the at least one biocide is free of aldehyde-releasing and/or aldehyde-based biocides.

2. The process according to claim 1, wherein the aqueous preparation of step a) comprises:
   (i) at least one inorganic particulate material, and/or
   (ii) at least one organic material.

3. The process according to claim 2, wherein the at least one inorganic particulate material is selected from the group consisting of natural ground calcium carbonate, natural and/or synthetic precipitated calcium carbonate, dolomite, kaolin, talcum, aluminium hydroxide, aluminium silicate, titanium dioxide, and any mixture thereof, and the at least one organic material is selected from the group consisting of carbohydrates, starch, sugar, cellulose and cellulose based pulp, glycerol, hydrocarbons, and any mixture thereof.

4. The process according to claim 2, wherein the at least one inorganic particulate material is natural ground calcium carbonate and/or synthetic precipitated calcium carbonate.

5. The process according to claim 1, wherein the aqueous preparation of step a) and/or of step d) and/or of step e) has:
   (i) a pH value of from 2 to 12, and/or
   (ii) a solids content of up to 85.0 wt.-%, based on the total weight of the aqueous preparation.

6. The process according to claim 1, wherein the aqueous preparation of step a) and/or of step d) and/or of step e) has:
   (i) a pH value of from 6 to 12, and/or
   (ii) a solids content of from 10.0 to 82.0 wt.-%, based on the total weight of the aqueous preparation.

7. The process according to claim 1, wherein the aqueous preparation of step a) and/or of step d) and/or of step e) has:
   (i) a pH value of from 7 to 10.5, and/or
   (ii) a solids content of from 20.0 to 80.0 wt.-%, based on the total weight of the aqueous preparation.

8. The process according to claim 1, wherein the at least one strain of bacteria is selected from the group consisting of gram-negative bacteria, gram-positive bacteria, and any mixture thereof.

9. The process according to claim 1, wherein:
   (i) the at least one strain of bacteria is selected from the group consisting of *Methylobacterium* sp., *Salmonella* sp., *Escherichia* sp., *Escherichia coli*, *Shigella* sp., *Enterobacter* sp., *Pseudomonas* sp., *Pseudomonas mendocina*, *Bdellovibrio* sp., *Agrobacterium* sp., *Alcaligenes* sp., *Flavobacterium* sp., *Rhizobium* sp., *Sphingobacterium* sp., *Aeromonas* sp., *Chromobacterium* sp., *Vibrio* sp., *Hyphomicrobium* sp., *Leptothrix* sp., *Micrococcus* sp., *Staphylococcus* sp., *Staphylococcus aureus*, *Agromyces* sp., *Acidovorax* sp., and any mixture thereof, and/or
   (ii) the at least one strain of yeast is selected from the group consisting of *Saccharomycotina*, *Taphrinomycotina*, *Schizosaccharomycetes*, *Basidiomycota*, *Agaricomycotina*, *Tr emellomycetes*, *Pucciniomycotina*, *Microbotryomycetes*, *Candida* sp., *Candida albicans*, *Candida tropicalis*, *Candida stellatoidea*, *Candida glabrata*, *Candida krusei*, *Candida guilliermondii*, *Candida viswanathii*, *Candida lusitaniae*, *Yarrowia* sp., *Yarrowia lipolytica*, *Cryptococcus* sp., Crypto*coccus gattii*, *Cryptococcus neofarmans*, *Zygosaccharomyces* sp., *Rhodotorula* sp., *Rhodotorula mucilaginosa*, and any mixture thereof, and/or
   (iii) the at least one strain of mould is selected from the group consisting of *Acremonium* sp., *Alternaria* sp., *Aspergillus* sp., *Cladosporium* sp., *Fusarium* sp., *Mucor* sp., *Penicillium* sp., *Rhizopus* sp., *Stachybotrys* sp., *Trichoderma* sp., *Dematiaceae* sp., *Phoma* sp., *Eurotium* sp., *Scopulariopsis* sp., *Aureobasidium* sp., *Monilia* sp., *Botrytis* sp., *Stemphylium* sp., *Chaetomium* sp., *Mycelia* sp., *Neurospora* sp., *Ulocladium* sp., *Paecilomyces* sp., *Wallemia* sp., *Curvularia* sp., and any mixture thereof.

10. The process according to claim 1, wherein the at least one water soluble source of lithium ions is at least one lithium salt.

11. The process according to claim 1, wherein the at least one water soluble source of lithium ions is at least one lithium salt selected from the group consisting of lithium carbonate, lithium chloride, lithium hydroxide, lithium phosphate, lithium citrate, lithium maleate, lithium acetate and lithium lactate, polymeric salts of lithium, and any mixture thereof.

12. The process according to claim 1, wherein the at least one water soluble source of lithium ions is a polymeric salt of lithium selected from the group consisting of lithium salts of acrylic homopolymers, acrylic copolymers, copolymers of acrylic acid and maleic acid and/or acrylamide, polyphosphates, and any mixture thereof.

13. The process according to claim 1, wherein the at least one water soluble source of lithium ions is a polymeric salt of lithium selected from the group consisting of $Li_2Na_2$polyphosphate, lithium-sodium hexamethaphosphate, lithium polyacrylate.

14. The process according to claim 1, wherein the at least one biocide is selected to be:
   (i) in an amount of at least 9%, below the minimum inhibitory concentration (MIC) of the at least one biocide for the at least one strain of bacteria and/or at least one strain of yeast and/or at least one strain of mould, and/or
   (ii) in an amount of from 0.5 ppm to 6000 ppm, calculated relative to the weight of water in the aqueous preparation.

15. The process according to claim 1, wherein the at least one biocide is selected to be in an amount of at least 33%, below the minimum inhibitory concentration (MIC) of the at least one biocide for the at least one strain of bacteria and/or at least one strain.

16. The process according to claim 1, wherein the at least one biocide is selected to be in an amount of at least 50%, below the minimum inhibitory concentration (MIC) of the at least one biocide for the at least one strain of bacteria and/or at least one strain.

17. The process according to claim 1, wherein the at least one biocide is selected to be in an amount of at least 75%, below the minimum inhibitory concentration (MIC) of the at least one biocide for the at least one strain of bacteria and/or at least one strain.

18. The process according to claim 1, wherein the amount of the lithium ions and the amount of the at least one biocide are selected so that the minimum inhibitory concentration (MIC) of the biocide meets equation (Ia), or equation (Ib), or equation (Ic):

$$MIC_{withoutLi}/MIC_{Li} > 1.5 \quad (Ia)$$

$$MIC_{withoutLi}/MIC_{Li} > 2.0 \quad (Ib)$$

$$MIC_{withoutLi}/MIC_{Li} > 4.0 \quad (Ic)$$

wherein
   $MIC_{withoutLi}$ is the minimum inhibitory concentration (MIC) of the biocide against the at least one strain of bacteria and/or at least one strain of yeast and/or at least one strain of mould without the at least one water soluble source of lithium ions in ppm calculated relative to the weight of water in the aqueous preparation of step a),
   $MIC_{Li}$ is the minimum inhibitory concentration (MIC) of the biocide against the at least one strain of bacteria and/or at least one strain of yeast and/or at least one strain of mould with the at least one water soluble source of lithium ions in ppm calculated relative to the weight of water in the aqueous preparation of step a).

19. The process according to claim 1, wherein the total amount of lithium ions is selected from 15.0 to 700.0 mMol/L, calculated relative to the weight of water in the preparation.

20. The process according to claim 1, wherein step e) is carried out before step d).

21. The process according to claim 1, wherein step d) and/or step e) is/are repeated one or more times.

* * * * *